Pascal Spurlino
Mayo A. Goodbar
and Marvin D. Frost
Inventors

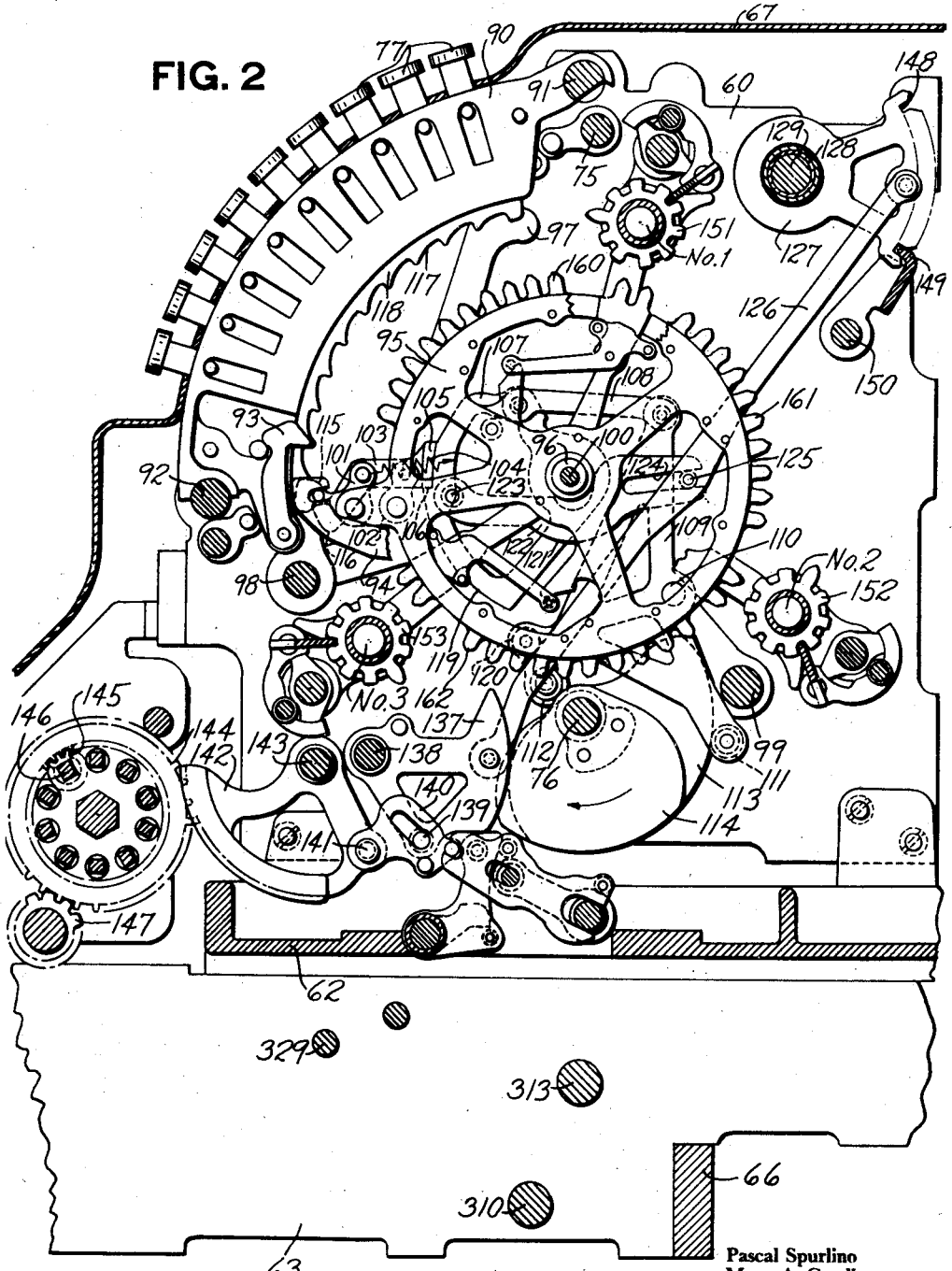

July 18, 1944.　　P. SPURLINO ET AL　　2,353,938
ACCOUNTING MACHINE
Filed Nov. 14, 1941　　9 Sheets-Sheet 3
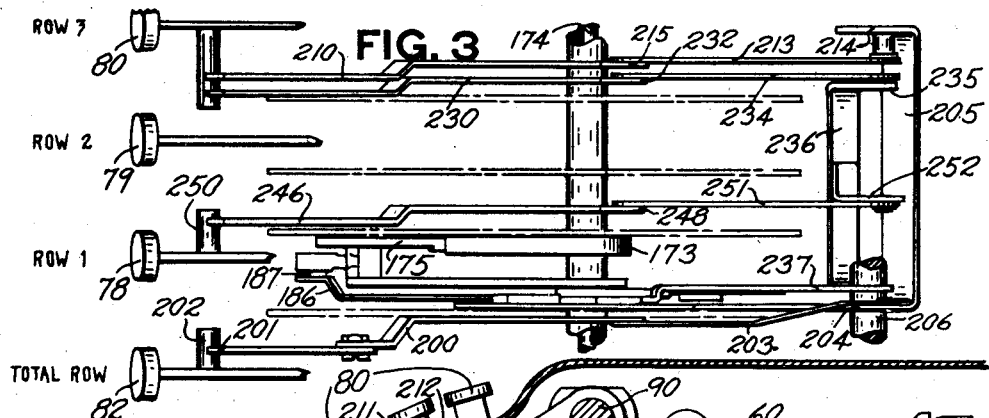
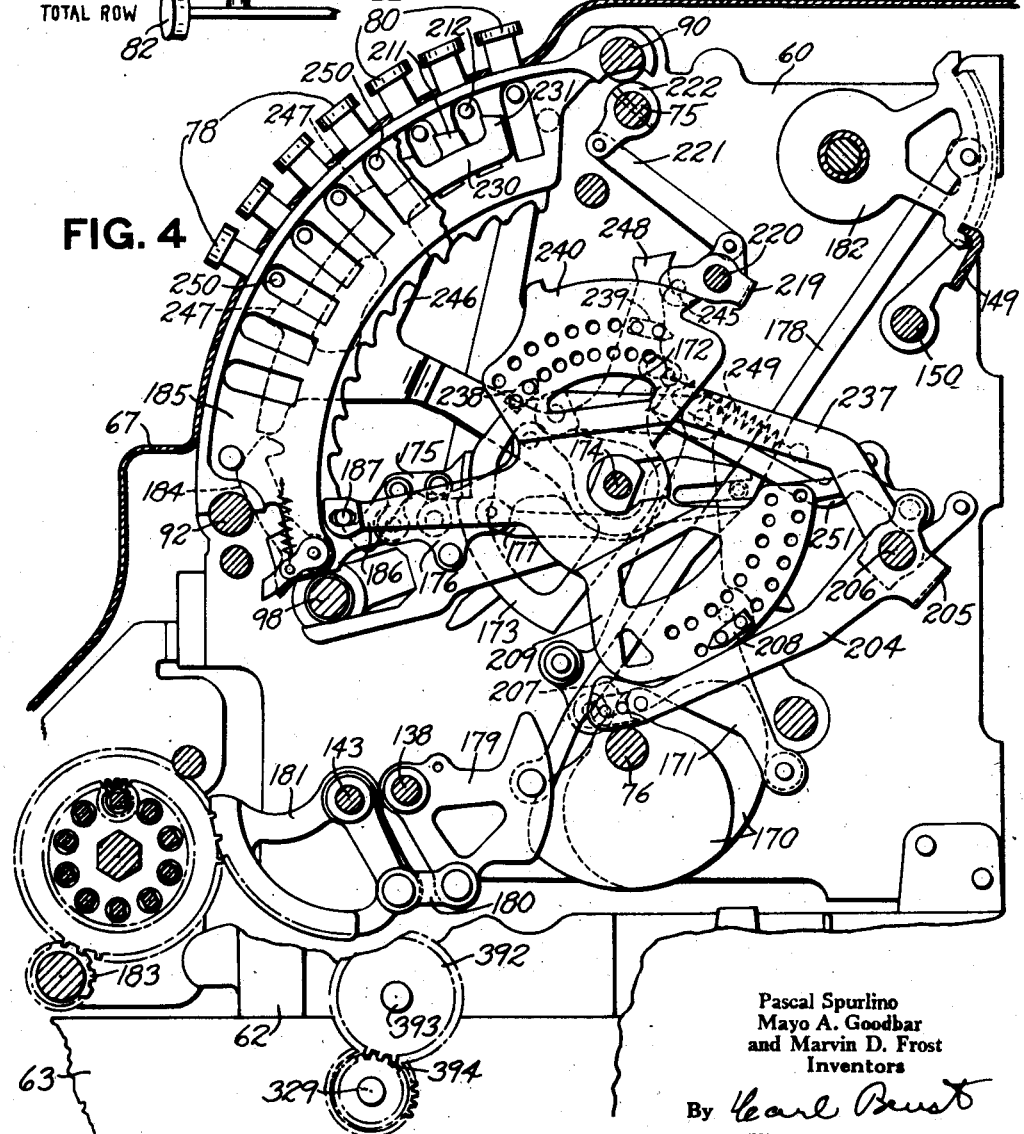
Pascal Spurlino
Mayo A. Goodbar
and Marvin D. Frost
Inventors
By Pearl Brust
Their Attorney Pascal Spurlino
Mayo A. Goodbar
and Marvin D. Frost
Inventors By *Carl Beust*
Their Attorney July 18, 1944.   P. SPURLINO ET AL   2,353,938
ACCOUNTING MACHINE
Filed Nov. 14, 1941   9 Sheets-Sheet 5

Pascal Spurlino
Mayo A. Goodbar
and Marvin D. Frost
Inventors

By *Earl Benst*

Their Attorney

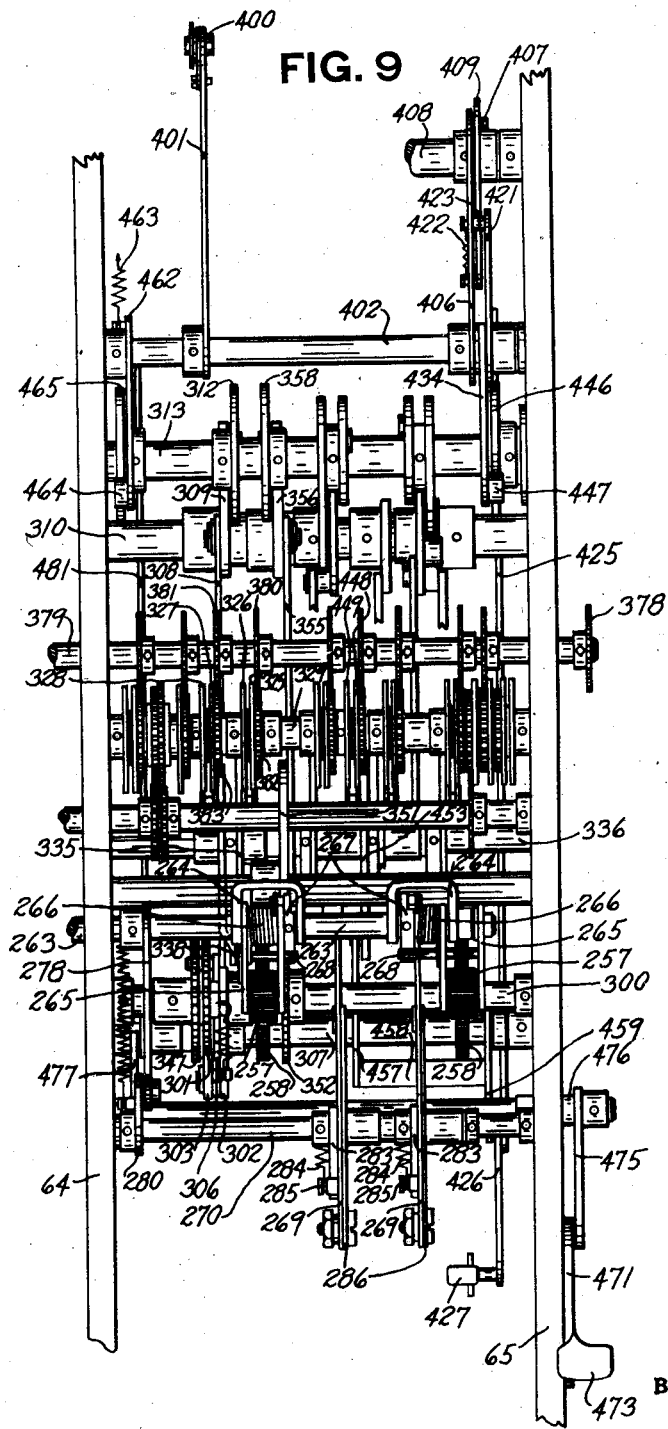

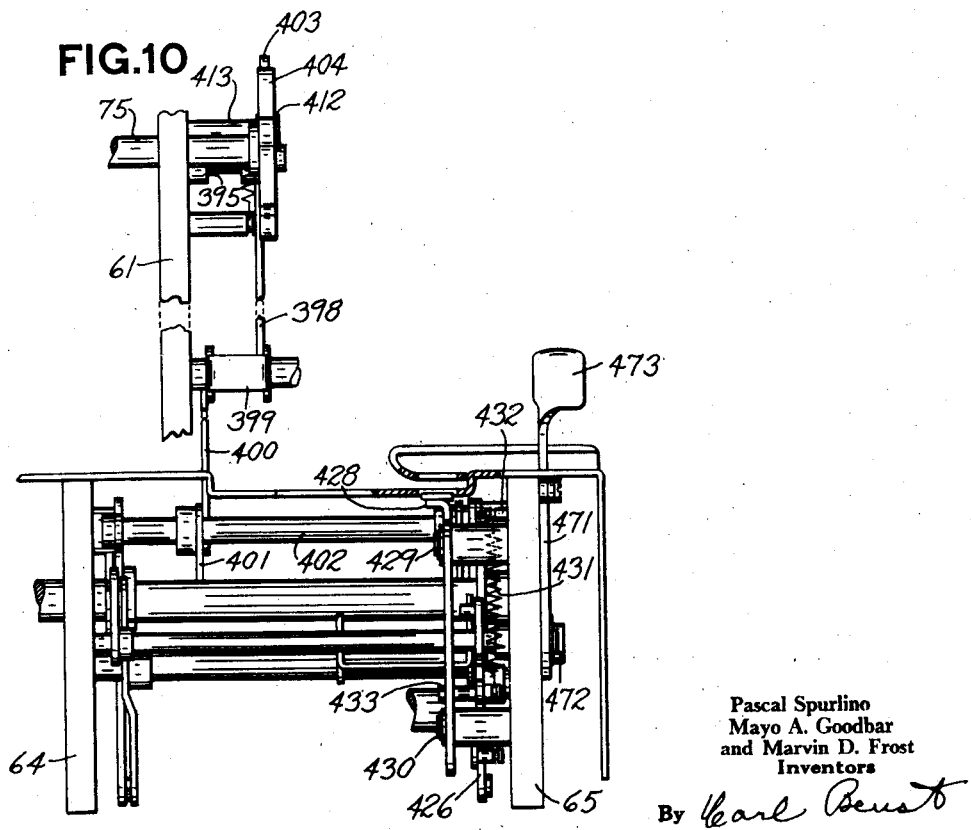

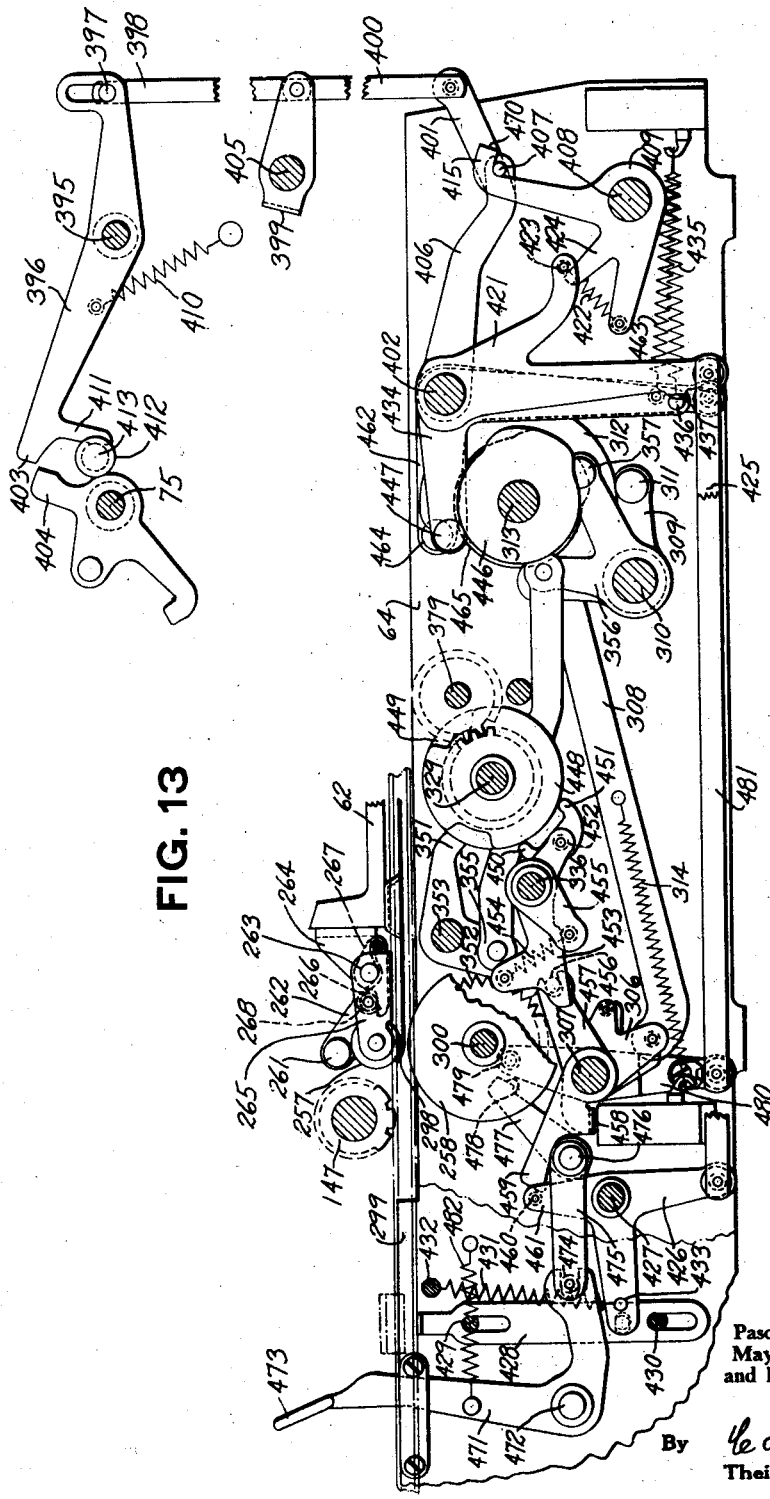

July 18, 1944.  P. SPURLINO ET AL  2,353,938
ACCOUNTING MACHINE
Filed Nov. 14, 1941   9 Sheets-Sheet 9
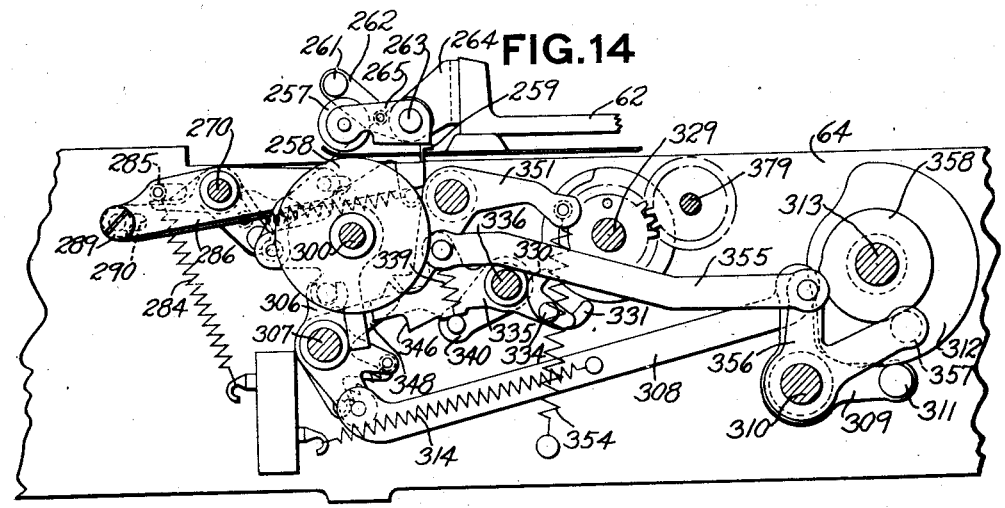
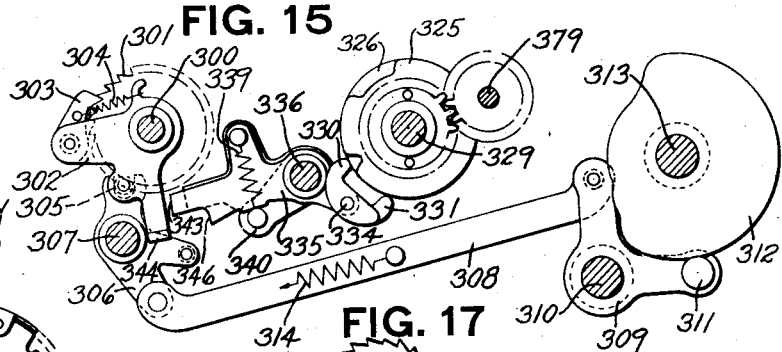
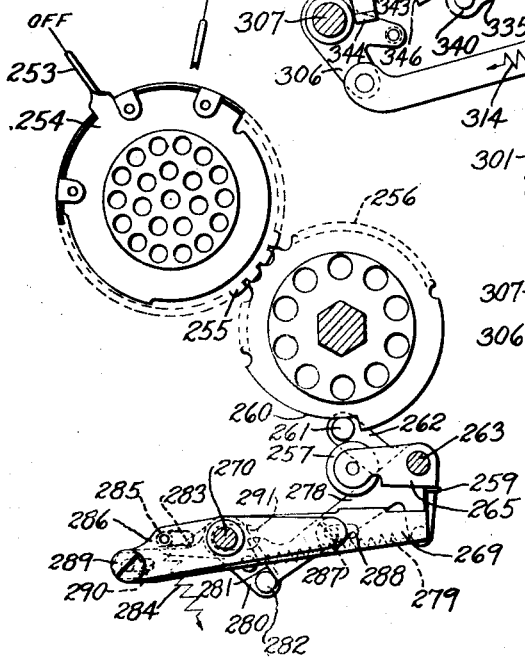
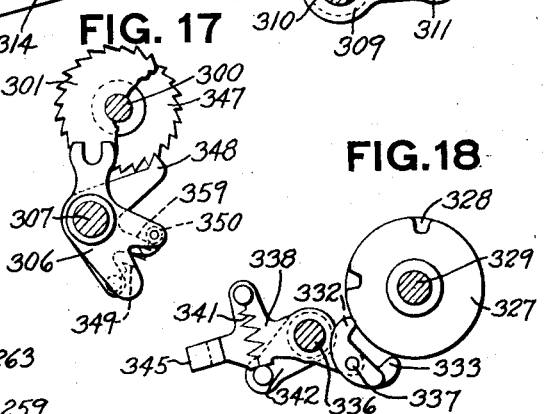
Pascal Spurlino
Mayo A. Goodbar
and Marvin D. Frost
Inventors
By *Earl Burt*
Their Attorney Patented July 18, 1944

2,353,938

UNITED STATES PATENT OFFICE 2,353,938

ACCOUNTING MACHINE

Pascal Spurlino, Mayo A. Goodbar, and Marvin D. Frost, Dayton, Ohio, assignors to The National Cash Register Company, Dayton, Ohio, a corporation of Maryland Application November 14, 1941, Serial No. 419,176

12 Claims. (Cl. 197—141)

This invention relates to accounting machines and similar business machines and is directed particularly to means for automatically locking the machine against operation after printing has taken place on a certain portion of record material inserted therein.

The invention is illustrated as applied to a machine of the general type disclosed in the following United States Letters Patent, and reference may be had to them for a complete showing and description of standard mechanisms not fully disclosed herein: Patents Nos. 1,619,796; 1,747,-397; 1,761,542; and 1,916,535, issued March 1, 1927; February 18, 1930; June 3, 1930; and July 4, 1933, respectively, to Bernis M. Shipley; No. 2,175,346, issued October 10, 1939, to Maximilian M. Goldberg; No. 2,141,332, issued December 27, 1938, to Charles H. Arnold; and No. 1,693,279, issued November 27, 1928, to Walter J. Kreider; and the following co-pending applications for United States Letters Patent for Accounting machines: Serial No. 324,462, filed March 18, 1940 (now Patent No. 2,305,000), by Mayo A. Goodbar; Serial No. 359,374, filed October 2, 1940, by Pascal Spurlino and Konrad Rauch; Serial No. 381,-962 (now Patent No. 2,345,839), filed March 6, 1941, by Pascal Spurlino, Mayo A. Goodbar, and Marvin D. Frost; and Serial No. 384,930 (now Patent No. 2,351,541), filed March 24, 1941, by Everett H. Placke.

The machine illustrated herein is especially adapted for use in connection with the preparation of payrolls and the writing of payroll checks. Such a machine, like the machine disclosed in the above-mentioned Placke application, is capable of accumulating therein the gross earnings of an employee, the various deductions usually made by the employer from said gross earnings, and the net earnings which are actually paid by the employer to the employee. The deductions just referred to may, for example, represent social security payments, group insurance premiums, loans, and other types of deductions corresponding to the captions on the transaction control keys disclosed in Fig. 1.

The present machine is also adapted to print the above-mentioned data on several different forms of record materials, such as, for example, an employee's itemized earnings record; a pay check, automatically numbered and dated; an itemized statement of gross earnings, reimbursements, deductions, and net earnings on a stub portion of the pay check; a check register form, and a payroll control form.

Since the present invention directly involves only the check register form and the payroll control form, only these two forms have been illustrated herein. These two forms are inserted into the machine at different times in order to have certain of the above-mentioned data printed thereon.

The check register form is automatically prepared for each payroll unit coincidentally with the preparation of the employee's earnings record and the completion of the payroll check and stub. The serial number and amount of each pay check printed by the machine are printed in appropriate columns provided therefor on the check register form. If, during the recording of an employee's entire earnings, there is no check register form in the machine, the machine will be locked against a subsequent operation by means provided by the present invention. Manually operable means is provided for releasing said locking means to permit the operator to insert a check register form in the machine, so that, when the pay check is printed, the proper record will also be printed on the check register form.

Also, when printing takes place in the next to the last printing space provided on the check register form, the above-mentioned means will lock the machine against subsequent operation. The operator may release said means manually in order to operate the machine for the purpose of printing a sub-total in the last printing space on said form, after which said means will again lock the machine against subsequent operation. However, if the system employed does not make such a sub-total desirable, then said means can be controlled to lock the machine against a subsequent operation after an operation in which printing takes place in the last printing space on the check register form. This enables the operator to make sure that a check register form is always in the machine at the proper time.

After the payroll unit has been completely prepared by the machine, the check register form is removed therefrom and the payroll control form is inserted in place thereof. Totals of each of the different kinds of entries—i. e., taxable wages, non-taxable wages, car fare, each class of deduction, etc.—are then cleared from their respective totalizers and printed in different spaces specifically provided therefor on the payroll control form. Each of said spaces on the payroll control form consists of two printing lines, one of said lines bearing a predetermined total which has been previously recorded by hand and the other one of said lines having printed thereon by the machine the total removed from its corresponding totalizer. This enables the totals thus recorded on the machine to be compared with the predetermined totals entered on said form.

After printing in the last printing space of the payroll control form, the above-mentioned means will again cause the machine to be locked against a subsequent operation. The operator is then compelled to release said locking means manually in order to remove such form from the machine preparatory to operating the machine again.

Also provided herein is selectively controlled feeding means common to both the check register form and the payroll control form for feeding the first-mentioned form only one printing space at a time and feeding the second-mentioned form the equivalent of two spaces at one time. The need for feeding the payroll control form in such manner is due to the different arrangement of the printing spaces thereon.

It is, therefore, an object of this invention to provide an accounting machine with means for automatically locking the machine against operation after an operation in which printing takes place on a certain portion of record material inserted therein.

Another object is to provide means for automatically locking the machine against operation after an operation of the machine without certain record material therein.

An additional object is to provide selectively controlled means for automatically locking the machine against operation after an operation in which printing is performed on a certain portion of inserted record material.

A further object is to provide means, which is actuated during an operation of the machine in which printing is performed on a certain portion of inserted record material, for automatically locking the machine against a subsequent operation.

Another object is to provide means for automatically locking the machine against operation subsequently to an operation in which printing takes place on the last printing space of inserted record material.

Another object is to provide means for automatically locking the machine against operation either after an operation in which printing takes place on a certain portion of inserted record material or after an operation in which no such record material is in the machine, and manually operable means for releasing said locking means.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 2 is a section of the machine taken to the right of one of the amount banks of keys, showing the differential mechanism associated therewith.

Fig. 3 is a skeleton view of a portion of the mechanism for controlling the operation of the differential mechanisms of certain of the banks of transaction keys by certain of the transaction keys in either bank, and also by the keys in the total bank.

Fig. 4 is a section of the machine taken to the right of the row 1 bank of keys, looking toward the left of the machine, showing said key bank cut away at the top to illustrate detents associated with the upper keys in the row 3 bank, and a portion of the means controlled by said keys for breaking the differential latch of the mechanism associated with the row 1 key.

Figure 5:
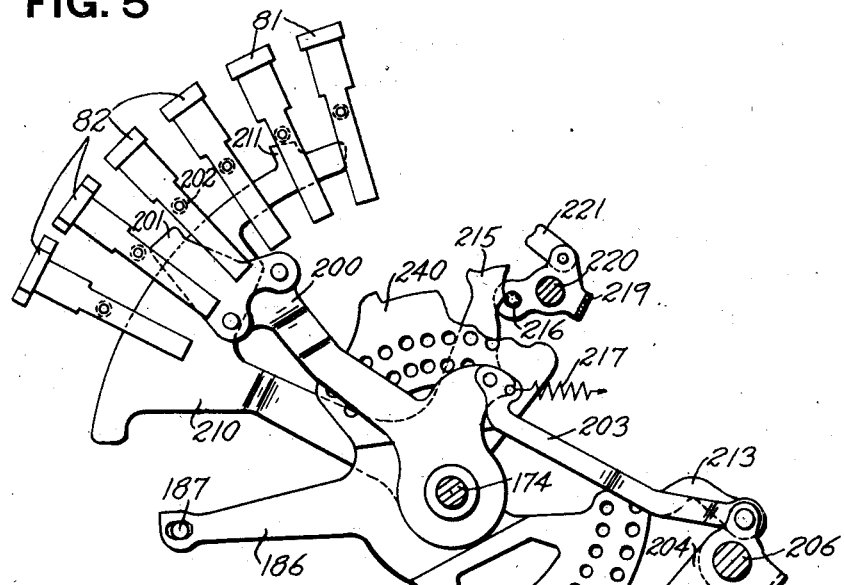

Fig. 5 is a fragmentary detailed side view of the means controlled by the total row of keys for breaking the differential latch associated with the row 1 key.

Figure 6:
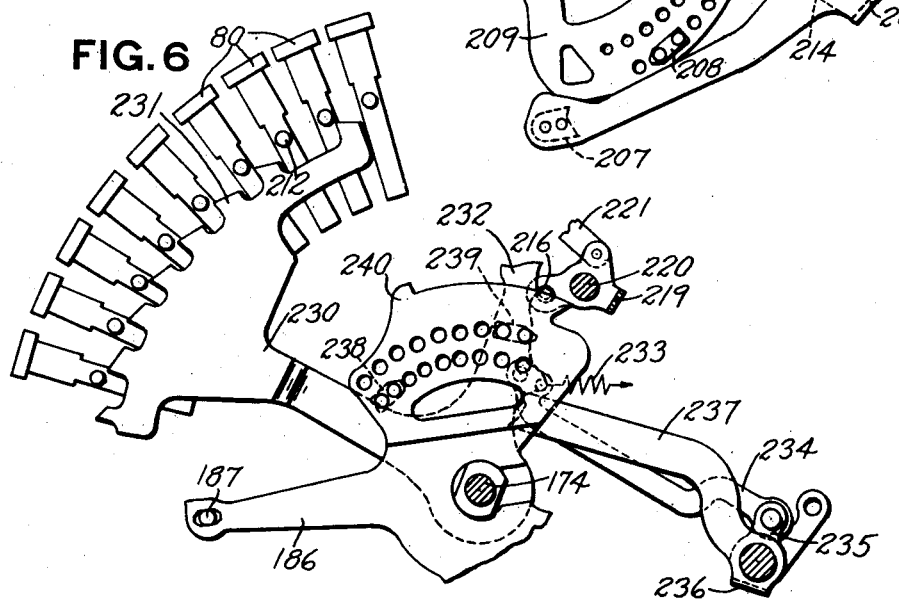

Fig. 6 is a fragmentary detailed side view of the means controlled by the row 3 keys for breaking the differential latch of the mechanism associated with the row 1 key.

Figure 7:
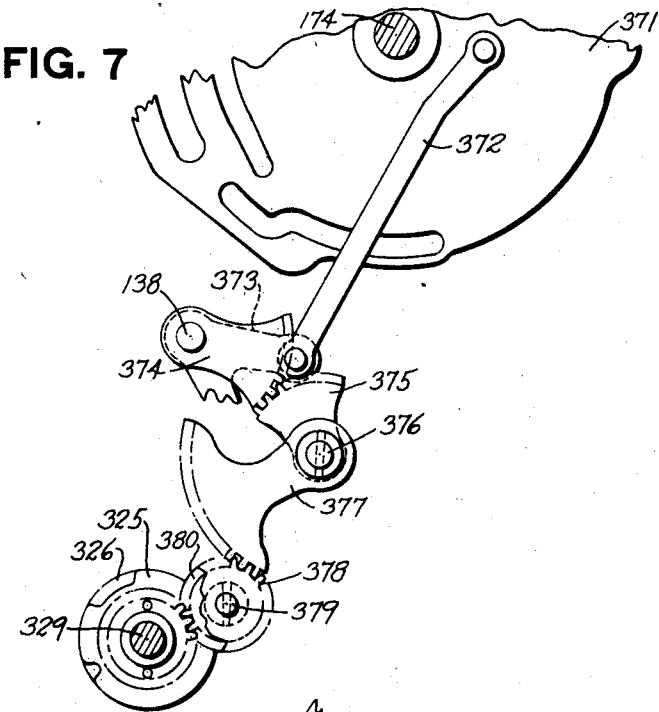

Fig. 7 is a detailed side view of the mechanism controlled by the row of total keys for differentially adjusting the means for controlling the operation of the machine locking means.

Figure 8:
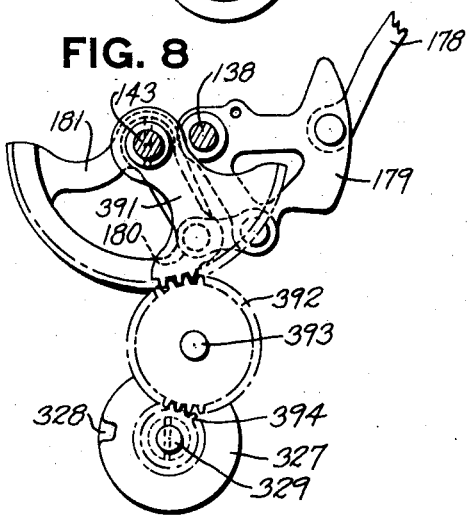

Fig. 8 is a detailed side view of the mechanism controlled by the row 1 key for differentially adjusting the means for controlling the operation of the machine locking means.

Fig. 9 is a top plan view of the feeding means, the locking means, and the manually operable means for releasing said locking means.

Fig. 10 is a fragmentary top plan view of the manually operable means for releasing the locking means.

Fig. 11 is a facsimile of a portion of the payroll control form.

Fig. 12 is a facsimile of a portion of the pay check register form.

Fig. 13 is a detailed side elevation of the locking means, the selectively controlled means for controlling the operation of the locking means, and the manually operable means for releasing said locking means.

Fig. 14 is a detailed side view of the feeding mechanism for both the pay check register form and the payroll control form.

Fig. 15 is a detailed side view of the selectively controlled means for controlling the feeding mechanism to feed the record materials variable distances.

Fig. 16 is a detailed side view of the manual means for rendering the feeding mechanism operable.

Fig. 17 is a detailed side view of a portion of the feeding mechanism.

Fig. 18 is a detailed side view of the control disk which is differentially adjusted under control of certain of the total keys for controlling the feeding mechanism during the feeding of the payroll control form.

*General description*

Described in general terms, the machine embodying the instant invention is of the type generally disclosed in the above-mentioned Shipley and Goldberg patents and the co-pending application of Placke. These patents disclose a plurality of totalizers into which may be distributed various amounts, according to the business system for which the machine is built. In the present instance, totalizers are adapted to receive the many and various items constituting individual transactions that are handled in the process of making out payroll checks. The above-mentioned patents also disclose what is known in the art as an "add and subtract totalizer" or "cross footer," from which a balance may be printed at any desired time.

Also provided in the machine embodying the present invention is an internal gear driving mechanism of the type disclosed in the above-mentioned Kreider patent, which is for the purpose of simultaneously setting up on groups of printing devices amounts and data under control of the keys so that printing can be readily accomplished on a plurality of different record materials at the same time.

As previously mentioned, the machine keyboard is arranged to take care of business systems in connection with organizations that wish to issue payroll checks and keep very complete records of all the various transactions which pertain to the issuance of any particular payroll check. The machine is therefore provided with amount keys of sufficient capacity to take care of such type of business. There are also three rows of what is known in the art as "control keys," for the purpose of selecting various totalizers for the distribution of a transaction entered in the machine. In addition, there is also a row of total-taking keys, which control the machine for the purpose of taking totals of the necessary items in connection with the printing of the pay check and clearing the various totalizers at the close of any day when it is desired to clear out the machine to render it ready for business for the following day or any other following period.

The rows of control keys above mentioned will hereinafter be referred to as transaction keys and are numbered row 1, row 2, and row 3, for the purpose of a better understanding of the controls effected by these keys over the feeding mechanism and the machine locking mechanism. The extreme right-hand row of keys in Fig. 1 will be referred to hereinafter as the total row.

Detailed Description

Framework and operating mechanism

The machine framework for the main part of the machine comprises a pair of side frames 60 and 61 (Figs. 2, 4, and 10), which support most of the machine mechanisms and which are in turn secured to a base 62 (Fig. 2) and are further supported in relation to each other by various cross frames, rods, and bars. The base 62 rests on and is secured to four printer side frames, only the left-hand frame 63 (Fig. 2) and the two right-hand frames 64 and 65 (Figs. 9 and 10) being shown herein. The printer frames are in turn mounted on the usual type of sub-base and are held in proper lateral relation to each other by various rods and tie bars, one of the tie bars 66 being shown in Fig. 2.

The machine proper, including the printer mechanism thereof, is enclosed in a suitable cabinet 67 (Figs. 2 and 4) having the necessary hinged sections for the operator to gain access to certain parts of the machine whenever necessary. All of the hinged sections, wherever necessary, are provided with suitable locks to prevent unauthorized persons from having access to the inner parts of the machine.

Normally, the machine is electrically operated by a conventional type of motor, such as that disclosed in the Shipley patents hereinbefore referred to, and in addition a hand crank is provided for operating the machine manually when necessary. The well-known electric starting bar used on previous machines of this type has been omitted from this machine, and, instead, the machine is released for operation by depression of any one of a plurality of so-called "motorized" or "operating" keys, located in the transaction rows 1, 2, and 3 and also located in the lower half of the total row. These keys will be explained more in detail hereinafter.

Depression of any of the operating keys releases a key lock shaft 75 (Figs. 2, 4, 10, and 13) to the action of a spring (not shown here but disclosed in the first-mentioned Shipley patent) which rocks said shaft a slight distance clockwise to operate the clutch mechanism which connects a driving motor to a main drive shaft 76 (Figs. 2 and 3) journaled in the side frames 60 and 61. The movement of the shaft 75 also simultaneously operates the switch mechanism which closes the circuit to the motor, thus causing the motor to operate to drive the main drive shaft 76.

The illustrated machine is adapted to perform two different types of operation, one of which is an adding operation and consists of one cycle of operation and the other of which is a total operation and consists of two cycles of operation.

After the machine has performed the proper number of cycles to complete the type of operation being executed, the key lock shaft 75 is returned counter-clockwise to disengage the clutch mechanism and simultaneously open the switch to the electric motor. When the machine is manually operated by the use of the hand crank, the operating keys are used for releasing the machine in exactly the same manner as when the machine is operated electrically.

Keyboard

Figure 1:
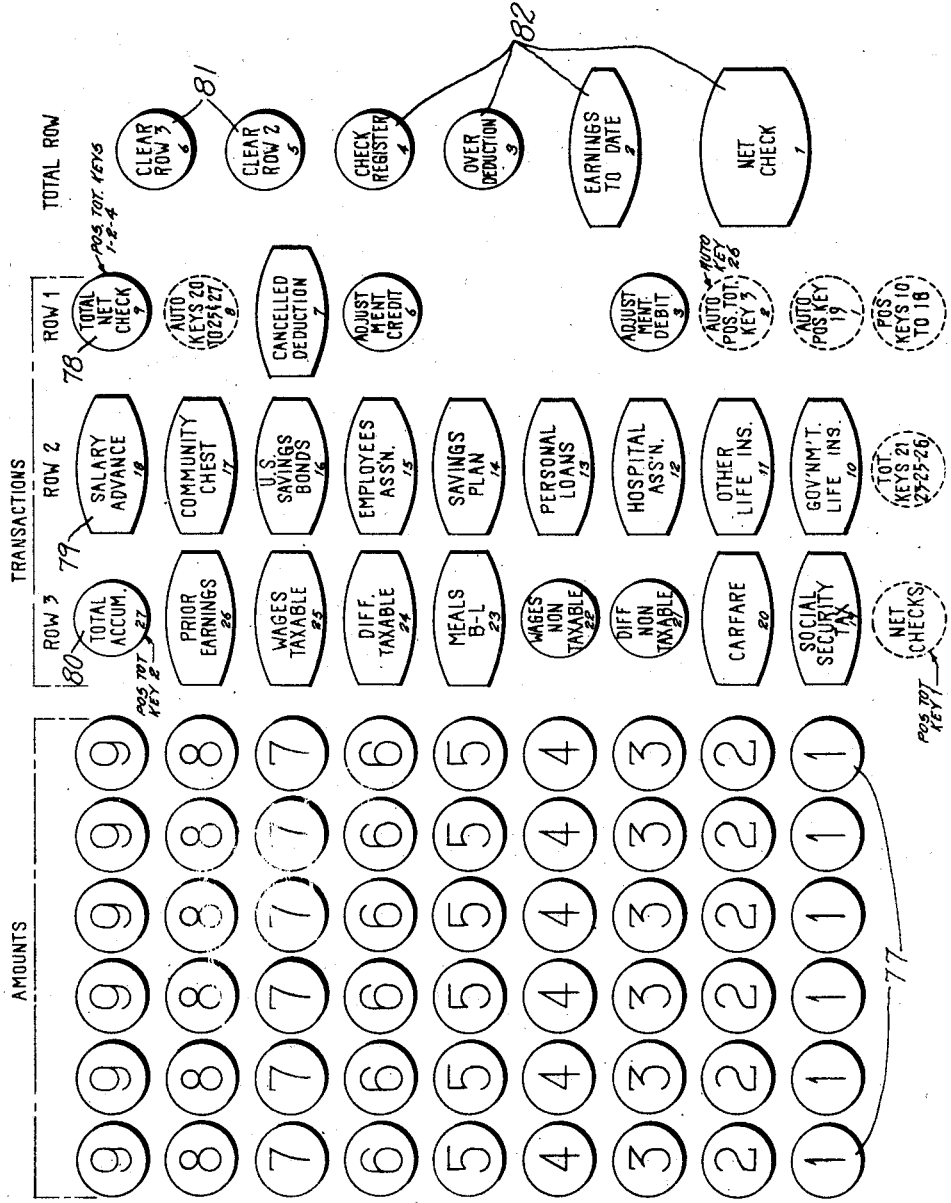
Fig. 1 is a diagrammatic view of the keyboard of the machine.

The keyboard of the machine is shown in diagrammatic form in Fig. 1, and it will be noted that there are six rows of amount keys 77, which are used to set up amounts to be added into the machine. There are also three rows of transaction keys, row 1 being numbered 78, row 2 being numbered 79, and row 3 being numbered 80. There is also a total row of keys, which includes two total keys 81, which are used for selecting the totalizers of the various lines corresponding to the rows 2 and 3 of the transaction keys when taking the totals of the individual totalizers associated with these two rows. In the total row, there are also four keys 82, which are used for selecting totalizers to print various totals necessary to complete the transaction associated with any one employee when his payroll check is printed on the machine.

The totalizers and their various arrangements, including the cross footer, will be discussed later under the heading of "Totalizers." However, it might be well to state here that the manner in which the transaction keys 78, 79, and 80 and the total keys 81 and 82 control the selection of the different totalizers, and the manner in which the keys 81 and 82 control the engaging and disengaging movement of the different totalizer lines, are fully explained in the Shipley patents previously referred to and also in the United States Patent No. 2,262,258 to Shipley, Spurlino, and Placke, dated November 11, 1941. Therefore, in view of the disclosures in the above-mentioned patents, only a general description will be given of the totalizers under that heading, as it is believed that the complete illustrations and descriptions of the totalizers in such patents will be sufficient for all purposes herein.

The present machine is capable of printing on certain of the same record material forms; i. e., employees' itemized earnings records, a pay check, and an itemized statement of gross earnings, reimbursements, deductions, and net earnings, on a stub portion of the pay check, as printed upon by the machine illustrated and described in the before-mentioned Placke application Serial No. 384,930. Since the construction and operation of the mechanism in the two machines for performing such printing are substantially alike, reference is hereby made to said Placke application for a full disclosure and description of such mechanism and record material forms. In addition, the present machine is adapted to print upon either one of two different record material forms; namely, the check register form and the payroll control form. It is in connection with the two last-mentioned forms that the present invention is concerned.

Certain of the keys in rows 1, 2, and 3, as well as in the total row, are adapted to selectively control the operation of means which will lock the machine against a subsequent operation during an operation in which printing takes place in the next to last printing space on the check register form, or in the last printing space on the payroll control form, depending upon which form happens to be in the machine. Also, the same keys will control the operation of said means to lock the machine against a subsequent operation when the machine is operated without having either a check register form or a payroll control form therein. It is this particular function of the above-mentioned keys that the present invention is concerned with, and the detailed description to be given hereinafter regarding such keys will be confined chiefly to the means by which said keys accomplish the above-mentioned results.

*Amount banks and their associated differential mechanisms*

As previously stated, the machine of this invention has six rows of amount keys, which are used to set up amounts to be entered into the machine. However, as all of the rows or banks of keys 77 and their associated differential mechanisms are similar in every respect, it is believed that a description of one of these rows of keys and its differential mechanism will be sufficient.

Fig. 2 is a transverse sectional view of the machine taken just to the right of one of the amount banks, showing said bank and its associated differential mechanism, which will be considered as representative of all of the amount banks.

The amount keys 77 are mounted in a key bank framework 90 supported by rods 91 and 92 extending between the main side frames 60 and 61 of the machine. Depression of one of the keys 77 rocks the zero stop pawl 93 for this particular denomination counter-clockwise out of the path of a reset spider 94 free on a hub of an amount differential actuator 95 rotatably supported by a hub 96 extending between two similar amount differential support plates 97 (only one of which is shown) in turn supported by rods 98 and 99 extending between the side frames 60 and 61. There are a pair of support plates 97 for each amount differential and a tie rod 100 extending through the holes in the center of the hubs 96 to secure all of the amount differentials in a compact unit.

A slot in the forward end of the spider 94 engages a stud in a latch disengaging arm 101 pivoted on an extension of the actuator 95. The arm 101 and a companion arm 102 together support a differential latch 103 for horizontal shifting movement. A spring 104 urges the arms 101 and 102 and the latch 103 rearwardly to normally hold a foot-shaped projection 105 of said latch in engagement with a shoulder 106 on a differential driving segment 107 rotatably supported on the hub of the actuator 95. A link 108 pivotally connects the driving segment 107 to a cam lever 109 pivoted on a stud 110 in the left-hand one of the plates 97, and said lever 109 carries rollers 111 and 112, which cooperate, respectively, with the peripheries of companion plate cams 113 and 114 secured on the main drive shaft 76. Depression of one of the amount keys 77 likewise moves the lower end thereof into the path of a rounded surface 115 on an extension of the arm 101.

In adding operations, the main shaft 76 and the cams 113 and 114 make one clockwise revolution, causing the lever 109 to rock the driving segment 107 first clockwise and then counter-clockwise back to its normal position. During this clockwise movement, the segment 107, by means of the shoulder 106, in cooperation with the projection 105 of the latch 103, carries said latch and the amount actuator 95 clockwise in unison therewith until the rounded surface 115 contacts the stem of the depressed amount key 77. When this contact occurs, it rocks the latch arm 101 and its companion arm 102 counter-clockwise to disengage the projection 105 from the shoulder 106 to interrupt the clockwise movement of the actuator 95 and to position said actuator under control of the depressed amount key 77. Disengaging movement of the latch 103 moves a rounded projection 116 thereof into engagement with the corresponding one of a series of locating notches 117 formed in a plate 118 secured between the rod 98 and an upward extension of the left-hand support plate 97.

After the latch 103 is disengaged from the shoulder 106 of the segment 107, said segment continues its clockwise movement without interruption, causing an arcuate surface 119 thereof, in cooperation with the sole of the foot-shaped projection 105, to lock the projection 116 of the latch 103 in the notch 117 corresponding to the depressed amount key 77. When the lever 109 and the segment 107 reach the termini of their initial clockwise movements, a roller 120 carried by the lever 109 engages an arcuate surface 121 on the inside of an amount beam 122 pivoted at 123 to the actuator 95 and forces an arcuate surface on the upper edge of said beam to contact the hub of said actuator 95 to position the beam 122 in proportion to the depressed amount key 77. The beam 122 has a slot 124, which engages a stud 125 in a link 126, the upper end of which is pivotally connected to an indicator-positioning and totalizer-selecting segment 127 mounted on one of a series of nested tubes 128 supported by a shaft 129 journaled in the side frames 60 and 61. The lower end of the link 126 is pivotally connected to a segment 137 free on a shaft 138 journaled in the frames 60 and 61. The segment 137 carries a stud 139, which engages a camming slot in a zero elimination cam plate 140 pivotally mounted on a stud 141 in a segmental gear 142 free on a shaft 143 also journaled in the side frames 60 and 61.

The teeth of the segmental gear 142 mesh with the external teeth of an external-internal ring gear 144, the internal teeth of which mesh with a pinion 145, which drives a square shaft 146. The square shaft 146 in turn drives similar pinions meshing with the internal teeth of the gear similar to the gear 144, the external teeth of which gears are adapted to mesh with and drive corresponding denominational type wheels 147 in each row of the column printing mechanism, which column printing mechanism in the present case is for the purpose of printing on either the check register form or the payroll control form, as well as the employees' earnings records, pay check, and stub portion of the pay check.

This method of driving the type wheels of the column printing mechanism is fully explained in the previously-mentioned Arnold Patent No. 2,141,332 and embodies an application of the well-known Kreider principle of driving mechanism, as disclosed in the above-mentioned Kreider Patent No. 1,693,279.

For the purpose of properly alining the differential mechanism and the type wheels set thereby, there is provided on each of the segments 127 a series of notches 148 engaged by an aliner 149 secured to the shaft 150.

The aliner 149 is disengaged from the notches 148 during the differential setting of the type wheels, and, after they have been set under the control of the keys through the differential mechanism, the aliner 149 is again moved into engagement with the notches 148 to aline the type wheels during printing.

The zero elimination mechanism mentioned above, which is for the purpose of controlling the printing of zeros and which is controlled by the above-mentioned zero elimination cam plate 140, is not directly involved in the present invention, and therefore no further reference to such mechanism will be given herein. Such type of zero elimination mechanism is fully illustrated and described in the above-mentioned Arnold Patent No. 2,141,332.

Totalizers

The machine shown in this application has the usual three lines of totalizers, numbered 1, 2, and 3 in Fig. 2. The No. 1 line carries thereon only a balance totalizer, otherwise known as a "cross footer." The No. 2 line and the No. 3 line each carries thereon ten of the well-known interspersed type of adding totalizers.

The cross footer on the upper or No. 1 line is indicated by the reference numeral 151, while the adding totalizers on the No. 2 line and the No. 3 line are indicated by the reference numerals 152 and 153, respectively.

Totalizers of this type are old and well known in the art and are fully illustrated and described in the previously-mentioned Shipley patents, and therefore no further description of the construction of these totalizers is felt necessary herein.

As is usual in machines of this type, each of the actuators 95 is divided into three toothed sections 160, 161, and 162. The sections 160 actuate the cross footer on the No. 1 totalizer line, the sections 161 actuate the totalizers on the No. 2 line, and the sections 162 actuate the totalizers on the No. 3 line.

In adding operations, the wheels of the selected totalizer or totalizers, as the case may be, are engaged with their respective sets of actuating toothed sections 160, 161, and 162 of the actuators 95, after said actuators have completed their setting movement in a clockwise direction under control of the amount keys 77.

Return counter-clockwise movement of the actuators 95 rotates the wheels of the selected and engaged totalizer or totalizers in proportion to the value of the depressed amount keys 77 to enter into said totalizers the amount corresponding to the keys depressed. In subtract operations, the corresponding subtract wheels of the cross footer 151 are engaged with the teeth 160 of the actuator 95 exactly the same as in adding operations, and the return movement of the actuator reversely rotates the adding wheels of the cross footer through the usual reverse gearing, which is old and well known in the art and is shown in several of the above-mentioned Shipley patents.

If no amount key 77 (Fig. 2) is depressed, the zero stop pawl 93 remains in the path of the spider 94 upon the initial clockwise movement of the actuator 95 and engages said spider and disengages the latch 103 to locate said actuator in the zero position. After the actuator 95 is positioned at zero, the roller 120 positions the beam 122, the link 126, and the segments 127 and 137 in proportion thereto, as shown in Fig. 2.

At the end of any type of operation, the actuator 95 always returns to its home position, as shown in Fig. 2. However, the link 126 and the printing mechanism controlled thereby remain in their set positions at the end of machine operations and are moved directly from these positions to the new positions in succeeding operations of the machine through the same beam mechanism, which is also old and well known in the art and is often referred to as the "minimum movement device." The usual transfer mechanism is provided for transferring positive and negative amounts from lower to higher denominations.

Transaction keys and differential mechanisms associated therewith

As hereinbefore mentioned, the present machine is provided with three banks or rows of transaction keys 78, 79, and 80. All of the transaction keys have small numerals near the bottom thereof, running from 1 to 9 in row 1, from 10 to 18 in row 2, and from 19 to 27 in row 3, which indicate the various positions of these keys and the totals in the machine.

Besides selecting and controlling the operation of the printing mechanism, these keys control the selection of the totalizers for recording their data, which latter function will now be described in connction with each of the keys.

Considering first the keys in row 1, the No. 3 "Adjustment debit" key and the No. 6 "Adjustment credit" key are used to enter into either the minus side or the plus side of the cross footer the amount either overpaid or underpaid an employee. For example, supposing that the payroll is made up for the week on Friday and the employee's pay check is made out for an amount to cover his working on Saturday, if for any reason the employee fails to work on Saturday, he will still be paid for the time. Therefore, when the next week's pay check is made out, an adjusted debit will be made against the employee's earnings equal to the amount of last Saturday's earnings, for which he was previously overpaid. On the other hand, if the employee should work overtime after the pay check has been written, then he will not be paid for the overtime on that week's pay check, but will have an adjusted credit for such amount made on his next week's pay check.

The No. 7 "Cancelled deduction" key is used where the deductions made against the employee's earnings surpass the net amount earned, in which case the machine locks up when the "Net check" key 82 is depressed. The operator must then press the "Over-deduction" key 3 in the total row, which causes the machine to perform only the function of indicating the amount of the overdraft on the cross footer. The operator then selects one of the deductions corresponding to any one of the keys 10 to 18 and sets up the amount of such deduction on the amount keys 77, depresses the "Cancelled deduction key 7 (which is a non-operating key), and depresses whichever one of the keys 10 to 18 corresponds to such particular deduction. This places a plus balance on the cross footer.

The No. 9 "Total net check" key is used with the key No. 6 "Clear row 3" in the total row to clear the group total for row 3.

Considering now the transaction keys 79 in row 2, the keys numbered 10 to 18 inclusive are used in connection with amount keys 77 to add amounts of different deductions into their corresponding totalizers on line 2 and at the same time enter the same amount upon the minus side of the cross footer associated with row 1 and located on the No. 1 totalizer line.

Referring to transaction keys 80 in row 3, the "Social Security tax" key No. 19 is used with the amount keys 77 to add the amount of the Social Security tax into the appropriate totalizer on line 3 corresponding to such key and at the same time enter the same amount upon the minus side of the cross footer associated with the row 1 keys.

The "Car fare" key No. 20 is used with the amount keys 77 to add the amount of car fare upon the corresponding totalizer on line 3 and at the same time add onto the plus side of the cross footer associated with row 1.

The "Differential non-taxable" key No. 21 is used with the amount keys 77 to add upon the corresponding totalizer on line No. 3, at the same time adding such amount upon the plus side of the cross footer on line 1. This amount represents the difference between the regular rate and the overtime rate paid to an employee.

The "Wages and non-taxable" key No. 22 is used with the amount keys 77 to add upon the corresponding totalizer on line 3 and at the same time add such amount upon the plus side of the cross footer on line 1. This amount represents the employee's earnings which are non-taxable, as, for example, where the earnings have exceeded the $3,000.00 tax limit.

The "Meals B—L" key No. 23 is used with the amount keys 77 to add the amount upon the corresponding totalizer on line 3 and at the same time add such amount upon the group totalizer associated with row 2 and located on the No. 2 line. Such amount represents the amount advanced to an employee for the purchase of meals.

The "Differential taxable" key No. 24 is used with the amount keys 77 to add amounts on the corresponding totalizer on the No. 3 line, add the same amount upon the group totalizer on line 2, and add such amounts upon the plus side of the cross footer on line 1. This amount represents the difference between the regular rate and the overtime rate of an employee, which amount happens to be taxable.

The "Wages taxable" key No. 25 is used to add the amount of wages which is taxable upon the appropriate totalizer on the No. 3 line, add the same amount upon the group totalizer on the No. 2 line, and add such amount upon the plus side of the cross footer on the No. 1 line. Such amount represents the regular taxable wage paid to the employee.

The "Prior earnings" key No. 26 is used to add the amount of prior earnings of an employee upon the appropriate totalizer of the No. 3 line and at the same time add this amount upon the group totalizer on the No. 2 line.

It is understood that the captions on the various transaction keys 78, 79, and 80, as well as the total keys 81 and 82, are used for illustrative purposes and may be varied to suit the particular demands of any organization using the machine.

The differential mechanisms associated with the three rows of transaction keys 78, 79, and 80 are substantially the same, and therefore it is felt that a description of the row of keys 78 and the differential mechanism associated therewith will suffice for all. As this differential mechanism is similar to the amount differential mechanism described above and is fully illustrated and described in the patents referred to hereinbefore, only a brief description thereof will be necessary herein. As above stated, the keys 78 control transaction differential mechanism which selects either the plus side or the minus side of the cross footer on the No. 1 line to enter various amounts, and positions the printing wheels for printing symbols corresponding to the keys depressed. This bank of keys also controls, to a certain extent, the feeding of the check register form and the payroll control form and also controls the operation of the hammers in connection with printing on said forms. Such particular feeding mechanism is also controlled by the total row of keys, later to be described, and also by certain selected positions of the transaction keys of row 3.

The differential mechanism associated with the first control bank or row 1, which is controlled by keys 78 and certain of the keys 80 in row 3 and keys 82 in the total row, is illustrated in Figs. 3 and 4 and will be briefly described, as it is similar to the control differentials illustrated and described in the previously mentioned Shipley Patent No. 1,916,535.

The drive shaft 76 carries a pair of cams 170 for operating a lever 171 connected by a link 172 to the usual driving segment 173. The driving segment 173 and other parts of the differential mechanism are supported by a rod 174.

The segment 173, through the usual latch 175 carried by a differentially adjustable arm 176 supported by the rod 174, rocks the arm 176 clockwise until the forward end of the latch 175 contacts whichever one of the keys 78 is depressed, at which time the latch is separated from the driving segment, permitting the arm 176 to remain in the position to which it has been driven under control of the depressed key 78.

The differential arm 176 carries the usual minimum movement beam 177, connected to a link 178 fast to a segment arm 179 loose on the shaft 138, supported by the side frames 60 and 61. A link 180 connects the arm 179 with a segment 181 secured to the shaft 143, carried by the frames 60 and 61. The upper end of the link 178 is pivoted to an aliner segment 182, with which cooperates the previously mentioned aliner 149, which extends across all of the differentials. The segment 181, by means substantially like that previously described for the amount keys 77, sets a symbol type wheel 183 to print identifying symbols on the record material in the manner disclosed in the above-mentioned Arnold patent.

The shaft 143, through means illustrated and described in the above-mentioned Placke application, operates certain control means in the printer, depending upon the type of entry being made in the machine.

The usual zero stop pawl 184, carried by a frame 185, in which the transaction keys 78 are slidably mounted, is adapted to cooperate with an arm 186 supported by the rod 174. The arm 186 has a slot to cooperate with a pin 187 of the latch 175 for this bank of keys 78. The zero stop pawl 184 is normally in an ineffective position, for a purpose to be described later.

Under certain conditions, it is necessary to control this differential mechanism (Fig. 4), associated with the row 1 transaction keys 78, by certain of the keys 79 and 80 in rows 2 and 3.

In other words, the keys numbered 20 to 25 and 27 in row 3 are adapted to cause the differential mechanism associated with row 1 to be stopped in the eighth position; the key numbered 19 will cause the same differential mechanism to be stopped in the first position; and the key numbered 26 will cause such differential mechanism to be stopped in the second position. The means by which these keys accomplish this result will be described later.

*Total row of keys*

As viewed in Fig. 1, there are six keys in the total row, two of which bear the reference numeral 81, while the remaining four keys bear the reference numeral 82. The keys 81 are used for selecting the totalizer lines to be engaged with the amount actuators 95 when the machine is cleared of the totals on the totalizers carried by such lines. This control from the keys is old and well known in the art and is of the type illustrated and described in the before-mentioned Shipley Patent No. 1,619,796.

The "Net check" key 82 is used to clear the cross footer on the No. 1 totalizer line and transfer the amount standing thereon, which represents the net amount for which the pay check is to be made out, to the group totalizer on the No. 3 totalizer line.

The "Earnings to date" key 82 is used to clear the group totalizer on the No. 2 line, in order to get the earnings to date and transfer such amount to the totalizers on the No. 3 line corresponding to the "Total accum." key 80 in row 3.

The "Check register" key 82 is used to read or take a sub-total of the cross footer, which amount is printed upon the check register form.

The "Clear row 2" key 81 is depressed in connection with any of the keys 79 in row 2, to clear the totalizers corresponding to such keys. The "Clear row 3" key 81 is depressed in connection with any of the transaction keys 80 in row 3, to clear any totalizer corresponding to said last-mentioned keys; also used with the "Total net check" key 78 to clear the group total on the No. 3 line.

The "Over-deduction" key 82 in the total row is adapted to cause the differential mechanism associated with the transaction keys 78 in row 1 to be stopped in the second position for the purpose of reading the cross footer. The means by which this result is accomplished will be described hereinafter.

*Automatic differential control from the transaction banks of keys in rows 1 and 3 and from the total row of keys*

As previously mentioned, under certain conditions it is necessary to control the differential mechanism associated with the bank of transaction keys 78 in row 1 from certain of the keys in row 3 and the total row, as well as from row 1, for the purpose of superseding the control exercised by certain of the keys in row 3.

The "Over-deduction" key 82 in the total row and the "Prior earnings" key 80 in row 3 are each adapted to stop the differential mechanism associated with the transaction keys 78 of row 1 in its second position. The means by which this result is accomplished will now be described.

Associated with the total row of keys 81—82 (Figs. 3 and 5) is an arm 200 freely mounted on the rod 174 and having a projection 201 adapted to cooperate with a pin 202 carried by the "Over-deduction" key 82. The arm 200 is connected by a link 203 to one arm 204 of a yoke 205 freely mounted on a rod 206 suitably supported in the hanger plates. The arm 204 carries near its free end a stop 207 adapted to be moved into the path of movement of a lug 208 secured on a lower plate 209 formed integral with the arm 186. When the stop 207 is moved into the path of the lug 208, it will stop the clockwise movement of the differential arm 186 in its second position. This is accomplished, upon the release and clockwise movement of the key lock shaft 75, by means to be described later. If the "Over-deduction" key 82 has been depressed, the projection 201 will strike the pin 202 and thereby arrest clockwise movement of the arm 200 and the yoke 205 and position the stop 207 in the path of movement of the lug 208. Upon clockwise movement of the differential arm 186 associated with the keys 78 in row 1, said arm will thus be stopped in its second position.

If the "Over-deduction" key 82 had not been pressed, the arm 200 and the yoke 205 would simply have moved clockwise far enough to position the stop 207 above and out of the path of movement of the lug 208 without exercising any control over the clockwise movement of the differential arm 186.

Associated with the transaction keys 80 in row 3 is a detent 210 (Figs. 3, 4, and 5) mounted on the rod 174 and having a lug 211 adapted to cooperate with the pin 212 mounted in the "Prior earnings" key 80. The detent 210 is connected by a link 213 to an arm 214 of the yoke 205. The detent 210 has formed integral therewith an upwardly-extending arm 215 normally held against a stud 216 by a spring 217 (Fig. 5), one end of which is fast to the arm 215 and the other end of which is secured to a stud carried by the hanger plate. The stud 216 is carried by one arm of a yoke 219 pivotally mounted on a rod 220 mounted in the hanger plates associated with the transaction keys 78, 79, and 80. The above-mentioned arm of the yoke 219 is connected by a link 221 with an arm 222 pinned to the lock shaft 75. Thus, upon the release and clockwise movement of the key lock shaft 75, previously described, the yoke 219 will thereby be rocked counter-clockwise, moving the stud 216 away from the arm 215 on the detent 210. This permits the spring 217 to rock the arm 215, the detent 210, the yoke 205, and the arm 204 clockwise. If the "Prior earnings" key 80 has been depressed, the clockwise movement of the detent 210 and the yoke 205 will be arrested by the lug 211 striking the pin 212 on said depressed key, which will position the stop 207 in the path of the lug 208 to stop the clockwise movement of the differential arm 186 in its second position.

If no keys 80 in row 3 had been depressed, the detent 210 and the yoke 205 would have moved sufficiently clockwise to position the stop 207 above and out of the path of movement of the lug 207, so that no control would have been exercised thereby over the clockwise movement of the differential mechanism associated with the keys 78 in row 1.

Certain of the other transaction keys 80 in row 3 are adapted to stop the differential mechanism associated with the transaction keys 78 of row 1 in different positions. The keys of row 3 bearing the numerals 20 to 25 inclusive and 27 on their captions are adapted to stop the row 1 differential mechanism in its eighth position, while the key bearing the numeral 19 on its caption is adapted to stop such differential mechanism in its first position. The means by which this result is accomplished will now be described.

Associated with the transaction keys 80 in row 3 is another detent 230 (Figs. 3, 4, and 6) pivotally mounted on the rod 174. The detent 230 has formed integral therewith a plurality of stop lugs 231, one for each of the keys bearing the numerals 19 to 25 inclusive and 27 on their captions. Also formed integral with the detent 230 is an upwardly-extending arm 232 normally held against the stud 216 by a spring 233 (Fig. 6), one end of which is fast to the arm 232 and the other end of which is secured to the hanger plate. Upon the release and clockwise movement of the key lock shaft 75, previously referred to, the yoke 219 will be rocked counter-clockwise, moving the stud 216 away from the arm 232. This permits the spring 233 to rock the arm 232 and the detent 230 clockwise. If one of the keys 20 to 25 and 27 has been depressed, the proper lug 231 will strike the usual pin 212 mounted in the side of the depressed key and thereby arrest the clockwise movement of the detent 230. The lugs 231 are so spaced on the detent 230 that they will contact the pin 212 of any depressed key 20 to 25 and 27, permitting the spring 233 to move the detent a definite distance for a purpose to be described later.

The detent 230 is connected by a link 234 to an arm 235 (Figs. 3 and 6) of a yoke 236 freely mounted on the rod 206. The yoke 236 has another arm 237, which is adapted to be moved into the path of movement of either a lug 238 or a lug 239 secured to a plate 240 formed integral with the upper portion of the differential arm 186. When the detent 230 is moved clockwise a short distance under control of one of the keys 20 to 25 inclusive and 27, the yoke 236 will, through the link 234, receive a like movement, which will position the arm 237 in the path of movement of the lug 238. Thus, upon the clockwise movement of the differential arm 186, the free end of the arm 237 will coact with the lug 238 to stop the differential arm 186 in its eighth position.

On the other hand, should the arm 237 be given a greater movement by reason of depression of the "Social Security" key 19, it will coact with the lug 239 to stop the differential arm 186 in its first position.

If none of the keys 19 to 25 inclusive and 27 are depressed, the detent will be rocked clockwise by the spring 233 sufficiently to rock the arm 237 clockwise to position the free end thereof above and out of the path of movement of either of the lugs 238 or 239.

There are instances in which both a key 80 in row 3 and a key 78 in row 1 are depressed, in which cases it is desirable that the control of the key 78 supersede the control of the key 80 over the differential mechanism associated with row 1. Means is provided herein for accomplishing this result and will now be described.

In the present illustration, only the "Adjustment debit" and "Adjustment credit" keys 78 in row 1 are adapted to supersede the control exercised by the key 19 in row 3 over the differential mechanism associated with row 1. Associated with the transaction keys 78 in row 1 is a detent 246 (Figs. 3 and 4) pivotally mounted on the rod 174. The detent 246 has formed integral therewith a plurality of stop lugs 247 (Fig. 4), one for each of the "Adjustment debit" and "Adjustment credit" keys 78. Also formed integral with the detent 246 is an upwardly-extending arm 248, normally held against a stud 245 on the yoke 219 by a spring 249. Thus, upon the release and clockwise movement of the key lock shaft 75, previously described, the yoke 219 will thereby be rocked counter-clockwise, moving the stud 245 away from the arm 248. This permits the spring 249 to rock the arm 248 and the detent 246 clockwise.

If either the "Adjustment debit" key or the "Adjustment credit" key 78 is depressed, the appropriate lug 247 will strike the usual pin 250 mounted in the side of the depressed key and thereby arrest the clockwise movement of the detent 246. The detent 246 is connected by a link 251 (Fig. 3) to an arm 252 secured to the yoke 236. Therefore, the extent of clockwise movement allowed the detent 246 by such depressed key will be transmitted, by the link 251, to the yoke 236, to position the arm 237 of the latter in the path of movement of the lug 238, to arrest the clockwise movement of the differential arm 186 in its eighth position.

The "Adjustment debit" and the "Adjustment credit" keys 78 in row 1 are depressed only in conjunction with the "Social Security tax," the "Diff. taxable," or the "Wages taxable" key 80 in row 3. It will be recalled that the "Social Security tax" key controls the row 1 differential mechanism to disengage the latch thereof in its first position of adjustment, while the "Diff. taxable" and "Wages taxable" keys control said mechanism to disengage the latch thereof in its eighth position. When either the "Adjustment debit" key or the "Adjustment credit" key is depressed in conjunction with the "Social Security tax" key 80, the control normally exercised by said last-mentioned key over the positioning of the arm 237 is superseded by the control of the depressed "Adjustment debit" key or "Adjustment credit" key, which, as above explained, positions the arm 237 so that the differential latch will be disengaged in the eighth position. However, before the differential mechanism reaches its eighth position, the end of the depressed "Adjustment debit" or "Adjustment credit" key 78 will coact with the differential arm 186 and disengage the latch in a position corresponding to the one of the two last-mentioned keys has been depressed.

Therefore, a corresponding adjustment is given to the shaft 143, which in turn controls the adjustment of the proper printing wheels and the selection of the plus side of the cross footer on the No. 1 totalizer line when the "Adjustment credit" key is operated, and the selection of the minus side of the cross footer upon operation of the "Adjustment debit" key.

If no key in either row 1 or row 3 is depressed, the detent 246 will move sufficiently clockwise to cause the arm 237 to be positioned above and out of the path of movement of the lugs 238 and 239. When the key lock shaft 75 is restored to its home position near the end of the operation of the machine, the stud 216 will coact with the arm 248 to return the detent 246 and its associated parts to their normal positions.

Printing mechanism

The printing mechanism used in connection with the present invention is of the column-printer type shown in the above-mentioned Arnold Patent No. 2,141,332, and is capable of printing the same amount and other data in various columns on suitable record material. The amount keys 77 differentially control the setting of the segmental gears 142 (Fig. 2), as heretofore described. The method of driving the columns of type wheels 147 (only one of which is shown in Fig. 2) from the differentially-positioned segmental gears 142 is by means of the ring gears 144, which have external teeth and internal teeth. These gears 144 are positioned by their external teeth, and the pinions 145, driven by the internal teeth thereof, operate the square shaft 146 carrying similar pinions, one for each column in which printing is to be duplicated. The latter pinions drive gears (not shown) which drive the type wheels 147.

The transaction keys 79, 70, and 80 (Figs. 3 and 4) control the positioning of the segments 181, which in turn, through the same type of mechanism as that just above described, position symbol printing wheels 183 for printing symbols in the different columns on the record material.

The above-mentioned method of driving type wheels is fully disclosed in the previously-mentioned Kreider Patent No. 1,693,279, and reference may be had thereto for a full understanding of the same.

Manually operable "on" and "off" means for controlling the operation of the feeding mechanism The present machine is provided with manually operable means for controlling the operation of the feeding mechanism. This means includes a lever 253 (Fig. 16) formed integral with a disk 254 secured to an internal-external gear 255 driving the usual square shaft and pinion, which in turn drive another internal-external gear, which meshes with a further internal-external gear 256. This type of driving mechanism is old and well known, as disclosed in the before-mentioned Kreider patent, and therefore will not be described herein. The lever 253 has two positions of adjustment; namely, "on" position and "off" position. When the lever 253 is in its "off" position, it controls means for holding pressure rollers 257 out of cooperative relation with record material feed rollers 258 (Figs. 9, 13, and 14) and maintaining stops 259 in the path of the record material, to thereby prevent the latter from being inserted beyond a certain point in the machine.

Movement of the lever 253 from the "off" position to the "on" position will, through the internal-external drive mechanism above referred to, rotate the gear 256 counter-clockwise. When this occurs, a camming surface 260, forming a portion of the periphery of the gear 256, will coact with a stud 261 carried by an arm 262 secured to a shaft 263 to rock said arm and said shaft counter-clockwise. The shaft 263 is suitably journaled in a pair of brackets 264 (Figs. 9 and 13) fast to a flange formed on the base plate 62. Pivotally mounted on the shaft 263 is a pair of yoke members 265, each of which has rotatably mounted therein one of a pair of pressure rollers 257, previously mentioned. Each of the yoke members 265 is connected by a torsion spring 266 to one of a pair of arms 267 fast to the shaft 263. The pressure rollers 257 are normally held out of cooperative relationship with the feed rollers 258 by forwardly-extending projections on the arms 267 coacting with the under sides of studs 268 carried by the yoke members 265. When the shaft 263 is rocked counter-clockwise, as above described, the forwardly-extending projections on the arms 267 are moved away from the studs 268, thereby permitting the torsion springs 266 to rock the yoke members 265 counter-clockwise to bring the pressure rollers 257 into cooperative relationship with the feed rollers 258.

Also, when the lever 253 is moved to its "on" position, the above-mentioned record material stops 259 (Figs. 9, 14, and 16) will thereby be removed from the path of feed of the record material. The stops 259 are formed integral with and at right angles to the ends of levers 269 pivotally mounted on a shaft 270 suitably journaled in the printer frames. The means for accomplishing this result will now be described.

Secured to the shaft 263 (Fig. 16) is a lever 278 normally urged in a clockwise direction by a spring 279, one end of which is fast to said lever, while the opposite end is connected to an arm 280 fast to the shaft 270. The lever 278 is provided with a camming surface 281, which coacts with a stud 282 secured to the arm 280. Also secured on the shaft 270 is a pair of arms 283 (Figs. 9 and 14), each associated with a different one of the levers 269. The levers 269 are normally urged in a counter-clockwise direction by springs 284 to maintain the stops 259 in their normal effective blocking positions. Each of the levers 269 carries a stud 285, which is normally held in contact with its proper arm 283 by the spring 284.

Also loose on the shaft 270 are two levers 286, one adjacent each of the levers 269, which have mounted therein, near their right-hand ends, studs 287 projecting through slots 288 formed in the lever 269. Near their opposite ends, the levers 286 carry adjusting bolts 289, which project through slots 290 formed in corresponding portions of the levers 269. The levers 269 are slidably mounted on the shaft 270 by reason of said shaft extending through slots 291 formed in said levers. It is thus possible, by the use of the adjustment bolts 289, to slidably adjust the levers 269 either forwardly or rearwardly to locate the stops 259 thereon which may be desirable.

Upon movement of the hand lever 253 from "off" position to "on" position, with the resultant counter-clockwise movement of the shaft 263, the lever 278 is rocked counter-clockwise to cause the surface 281 thereof to coact with the stud 282 and cam the arm 280, the shaft 270, and the arms 283 clockwise. During such clockwise movement, the arms 283 will coact with the studs 285 to rock the levers 269 clockwise, thereby removing the stops 259 from the path of the inserted record material.

The mechanism described above is substantially the same as that shown and described in the above-mentioned application of Spurlino et al., Serial No. 381,962, and reference may be had to such application for a more complete understanding of such mechanism.

Feeding mechanism

In the instant machine, the operator presents either a pay check form 296 or a payroll control form 297 to the printing mechanism (Fig. 13) by inserting said form into a throat, formed by a guide plate 298 and a table 299, which guides said form between the column printing type wheels 147 and their associated printing hammers (not shown here but like those shown in the above-mentioned application of Spurlino et al., Serial No. 381,962), then between the feed rollers 258 and their associated pressure rollers 257, and finally into contact with the stops 259 (Figs. 14 and 16) on the levers 269. The table 299 is mounted on the top edges of the frames 64 and 65. The guide plate 298 is suitably mounted above the table 299 to assist in guiding the forms between the pressure rollers and the feed rollers and into engagement with the stops 259. Before operating the machine, the operator moves the "on and off" lever 253 to the "on" position, which causes the pressure rollers 257 to be moved into cooperative relationship with the feed rollers 258 preparatory to feeding the inserted forms during any subsequent operation of the machine.

The feed rollers 258 are secured to a shaft 300 suitably journaled in the printer frames. Also secured to the shaft 300 is a line-spacing ratchet 301 (Figs. 15 and 17), which is adapted to be given variable clockwise movements to cause the feed rollers 258 to impart variable distances of feed to the pay check register and payroll control forms which are inserted in the machine. Loosely mounted on the shaft 300 is an arm 302 (Fig. 15) having pivoted thereto a feed pawl 303, which is normally held in engagement with the teeth of the ratchet 301 by a spring 304. The arm 302 carries a stud 305, which is engaged by the bifurcated end of the upper arm of a lever 306 freely mounted on a rod 307 suitably mounted in the printer side frame. The lower arm of the lever 306 is connected by a link 308 to one arm of a bell crank 309 loose on a rod 310 mounted in the printer side frames. The other arm of the bell crank 309 carries a roll 311, which coacts with the periphery of a cam 312 secured on a printer drive shaft 313 suitably journaled in the printer framework. A spring 314 constantly tends to draw the link 308 toward the left, to maintain the roll 311 in cooperative relationship with the cam 312. The same clockwise movement imparted to the main drive shaft 76 is transmitted to the printer drive shaft 313 through a train of gears such as that disclosed in the above-mentioned Shipley Patent No. 1,619,796.

When the shaft 313 is rotated clockwise, the cam 312 coacts with the roll 311 to rock the bell crank 309 first counter-clockwise and then clockwise. The bell crank 309, in turn, through the link 308 and the lever 306, imparts similar movement to the arm 302. The extent of the counter-clockwise movement imparted to the arm 302 will determine to what extent the pawl 303 will, upon the return clockwise movement of the arm 302, move the ratchet 301 and, consequently, the feed rollers 258. Means is provided, under control of certain of the keys 78 in row 1 and keys 81—82 in the Total row, for controlling the extent of counter-clockwise movement imparted to the arm 302, in order to determine the amount of feed, if any, which will be given to the feed rollers 258 and, through the latter, to the inserted forms. This means will now be described.

The above-mentioned control means includes two pairs of control disks 325—326 and 327—328 (Figs. 7, 8, 15, and 18) carried on a shaft 329 suitably journaled in the printer frames. The feelers 330 and 331 (Fig. 15) coact with the peripheries of the disks 325 and 326, respectively, while the feelers 332 and 333 (Fig. 18) coact with the peripheries of the disks 327 and 328, respectively.

The feelers 330 and 331 are secured together but arranged opposite each other and are pivotally mounted on a stud 334 secured to one arm of a lever 335 freely mounted on a shaft 336 journaled in the printer frames. The feelers 332 and 333 are arranged similarly to the feelers 330 and 331 and are pivotally mounted on a stud 337 secured to one arm of a lever 338 also freely mounted on the shaft 336. The lever 335 is resiliently connected by a spring 339 to an arm 340, and the lever 338 is likewise connected by a spring 341 to an arm 342, both of said arms being secured to the shaft 336. Immediately after the disks 325—328 are adjusted under control of their associated banks of keys, the shaft 336 and the arms 340 and 342 are given a counterclockwise movement by mechanism old and well known in the art and disclosed in Fig. 23 of the above-mentioned Arnold patent.

When the shaft 336 and the arms 340 and 342 are given a counter-clockwise movement, after the adjustment of the disks 325—328, the levers 335 and 338 will, through the medium of the springs 339 and 341, respectively, be urged counter-clockwise about the shaft 336, thereby causing the feelers 330—333 to coact with the peripheries of their associated disks 325—328. If the disk 325 has been adjusted so that a notched portion of the periphery thereof is opposite the feeler 330, the lever 335 will be permitted to move sufficiently counter-clockwise, under the influence of the spring 339, to position a surface 343 thereof in the path of movement of the lug 344 formed integral with the downwardly-projecting portion of the arm 302, thereby blocking the latter against any counter-clockwise movement and thus preventing any operation of the feed rollers 258. However, when the lever 335 is caused to remain in the position shown in Fig. 15, due to the fact that no notch is opposite the feeler 330, and if at this time the feeler 332 coacts with a notched portion of its associated disk 327, the lever 338 will be moved counter-clockwise by the spring 341 to position a blocking surface 345 thereon in the path of travel of the lug 344 to limit the counterclockwise movement of the arm 302 to such an extent as to engage the pawl 303 with the next tooth on the ratchet 301, and, upon the subsequent clockwise movement of the arm 302, the pawl 303 then moves the ratchet 301 and the feed rollers 258 one step in a clockwise direction, thus causing the inserted form to be fed only one printing line space.

If, during the counter-clockwise movement of the shaft 336 and the arms 340 and 342, both of the feelers 330 and 332 coact with unnotched portions of the peripheries of their respective disks 325 and 327, both of the levers 335 and 338 will be held against any counter-clockwise movement, influenced by the springs 339 and 341. The arm 302 will then be permitted to rock counter-clockwise until the lug 344 strikes another blocking surface 346 on the lever 335, thus engaging the pawl 303 with the next second tooth of the ratchet 301, and, upon the subsequent clockwise movement of the arm 302, the pawl 303 moves the ratchet 301 and the feed rollers 258 two steps in a clockwise direction, thereby causing the inserted form to be fed two printing line spaces.

Also secured on the shaft 300 is a retaining ratchet 347 for preventing any overthrow movement of the feed ratchet 301 and the feed rollers 258. Loosely mounted on the rod 307 is a pawl 348 connected by a spring 349 to the lever 306 and normally held in engagement with the teeth of the ratchet 347. When the lever 306 is rocked clockwise, preparatory to imparting a clockwise movement to the feed ratchet 301 and the feed rollers 258, a stud 350 on said lever will coact with a tail 359 of the pawl 348 to rock the latter clockwise. This will disengage the pawl 348 from the retaining ratchet 347 during the counter-clockwise movement of the arm 302 preparatory to imparting a clockwise movement to the ratchet 301 and the feed rollers 258. When the lever 306 is then rocked counter-clockwise, rocking the arm 302, the ratchet 301, and the feed rollers 258 clockwise, it will, through the spring 349, rock the pawl 348 counter-clockwise to engage the latter with the ratchet 347 to prevent any additional clockwise movement from being imparted thereto.

A retaining pawl 351 (Figs. 13 and 14) normally coacts with the teeth of a serrated aligning disk 352 secured to the shaft 309 to maintain the line-spacing ratchet 301 and the feed rollers 258 in their proper positions while the pawls 303 and 348 are disengaged from the teeth of their respective ratchets 301 and 347. The pawl 351 is pivotally mounted on a rod 353 secured in the printer frames and is normally held in engagement with the teeth of the aligning disks 352 by a spring 354. Means is provided for disengaging the pawl 351 from the aligning disk 352 during the clockwise movement of the feed ratchet 301 and the feed rollers 258. This means consists of a link 355 connecting the pawl 351 to one arm of a bell crank 356 freely mounted on the rod 310. The other arm of the bell crank 356 carries a stud 357, which, through the action of the spring 354, is maintained in cooperative relationship with the periphery of a cam 358 secured to the printer drive shaft 313. Upon the clockwise rotation of the shaft 313 and the cam 358, the latter will, through the stud 357, the bell crank 356, and the link 355, rock the pawl 351 counter-clockwise, against the action of a spring 354, to disengage said pawl from the aligning disk 352 at the proper time to facilitate the clockwise movement imparted by the pawl 303 to the feed ratchet 301 and the feed rollers 258.

The means by which the disks 325, 326, 327, and 328 are adjusted under control of the total row of keys 81—82 and the row 1 transaction keys 78 will now be described. Mounted on the rod 174 (Fig. 7) is the usual total control plate 371, which is fully illustrated and described in the above-mentioned Goldberg patent and is set differentially under control of the keys 81 and 82 in the total row. Pivoted to this total control plate 371 is a link 372, which is pivoted to an arm 373 journaled on the previously-described shaft 138. Secured to this arm 373 is a gear segment 374 meshing with a gear segment 375 secured to a shaft 376 pivotally supported in the machine. Also secured to this shaft 376 is a gear segment 377 meshing with a gear 378 fast on a shaft 379, which is supported by the printer frames 64 and 65 (Fig. 9). Fast on the shaft 379 are gears 380 and 381, which mesh with gears 382 and 383, respectively, which are loosely mounted on the shaft 329 and are secured to the total disks 325 and 327, respectively.

When the machine is operated with no key in the total row depressed, the disks 325 and 327 will, through the above train of mechanism, be maintained in their zero positions of adjustment, in which positions a notched portion of the periphery of the disk 325 will be opposite the feeler 330 to prevent any feeding movement from being imparted to the feed rollers 258, as previously described, while an unnotched portion of the periphery of the disk 327 will be opposite the feeler 332 to render the lever 338 ineffective. If the "Net check" key 82 had been depressed, the disks 325 and 327 would have been so adjusted that an unnotched portion of the periphery of the disk 325 would have been opposite the feeler 330 to render the lever 335 ineffective, and a notched portion of the periphery of the disk 327 would have been opposite the feelers 332 to thereby render the levers 338 effective to permit one step of movment to be imparted to the feed rollers 258. If either the "Earnings-to-date" key or the "Over-deduction" key 82 had been depressed, the disks 325 and 327 would have been adjusted so that the notched portions of the peripheries of the disk 325 would have been opposite the feeler 330 to render the lever 335 effective in preventing any feeding movment from being imparted to the feed rollers 258, while an unnotched portion of the periphery of the disk 327 would have been opposite the feeler 332 to render the lever 338 ineffective. If the "Check register" key 82 had been depressed, for the purpose of printing a total or a sub-total on the check register form 296, the disks 325 and 327 would have been so adjusted that an unnotched portion of the disk 325 would have been opposite the feeler 330 to render the lever 335 ineffective, while a notched portion of the disk 327 would have been opposite the feeler 332 to render the lever 338 effective in controlling the feeding movement of the feed rollers 258 to one printing line space.

It will thus be seen from the above that the control exercised by the four total keys 82 over the feed mechanism consists of either preventing any feeding movement from being imparted to the feed rollers 258 or limiting the feeding movement of said rollers to one printing line space. Further, these keys are generally used when a pay-check register form 296 has been inserted into the machine.

If the machine is operated with either the "Clear row 2" key or the "Clear row 3" key in the total row depressed, the disks 325 and 327 will be adjusted so that unnotched portions of the peripheries thereof will be opposite their associated feelers 330 and 332, thereby preventing any counter-clockwise movement of the levers 335 and 338. When this occurs, the arm 302 will be free to rock counter-clockwise until the lugs 344 strike the surface 346 of the lever 335, which will feed the inserted form, which in this case would be the payroll control form 297, two printing line spaces.

The means by which the disks 326 and 328 are adjusted under control of the transaction keys 78 in row 1 includes a gear segment 391 (Fig. 8) secured to the shaft 143. When the shaft 143 is rocked clockwise under control of the transaction keys 78, as previously described, the segment 391 will also be moved in a clockwise direction. The segment 391 meshes with a gear 392 freely mounted on a stud 393 carried by the base 62 (Fig. 4). The gear 392 meshes with a gear 394 secured to the shaft 329. Also secured to the shaft 329 are the disks 326 and 328, which are shown herein as having unnotched peripheries and, consequently, any position which they may assume under control of the keys 78 will prevent the feelers 331 and 333 from being moved under control of the springs 339 and 341 when the arms 340 and 342 are rocked counter-clockwise, whereby the feed control levers 335 and 338 are maintained in the positions shown in Figs. 15 and 18.

Automatic control for locking the machine against subsequent operation

Means is provided herein for automatically locking the machine against a subsequent operation when the machine is operated to perform certain kinds of operations under certain conditions. For example, such means will automatically lock the machine against a subsequent operation when the machine is operated to print on either a pay check register form 296 or a payroll control form 297 without either one of said forms being in the machine to receive such printing. This same means will also lock the machine against a subsequent operation when the machine is operated either to print in the next-to-last printing space on the pay check register form 296 or to print in the last printing space on the payroll control form 297. Manually operable means is provided for releasing the machine for operation after it has been locked against such operation by said means, in order to print a total or a sub-total in the last printing space on the pay check register form 296, whereupon said means will again lock the machine against a subsequent operation. In each instance where the machine is locked against operation by the above-mentioned means, it is necessary to release said locking means by use of a manually operable release means before the machine can be operated. The means for automatically locking the machine against a subsequent operation will now be described.

Suitably mounted on a rod 395 (Figs. 10 and 13) supported by the right side frame 61 is a lever 396, one arm of which is slotted to engage a stud 397 carried by one end of a link 398, the other end of which is pivoted to one arm of a yoke 399. The other arm of the yoke 399 is connected by a link 400 to the free end of an arm 401 secured to a shaft 402 suitably journaled in the printer side frames 64 and 65. The lever 396 is normally maintained in an ineffective position, as shown in Fig. 13, whereby a projection 403 formed integral therewith is out of the path of movement of a pawl 404 secured to the key lock shaft 75, previously described. When the shaft 75 is rocked clockwise, as previously described, to release the machine for operation, the pawl 404 is likewise rocked clockwise, provided the lever 396 has not been positioned so that the projection 403 thereof is in the path of movement of the pawl 404, and thus locks it against such clockwise movement, which would consequently prevent release of the machine for operation. The yoke 399 is mounted on a rod 405 suitably supported by the side frame 61. Also secured on the shaft 402 is another arm 406, carrying near its free end a stud 407. Pivotally mounted on a rod 408 carried by the printer frames 64 and 65 is a lever 409, one arm of which has a hook 415 to coact with the stud 407 to hold the arm 406, the shaft 402, and the arm 401 in a downward position, which, through the link 400, the yoke 399, and the link 398, maintains the lever 396 in its normal ineffective position against the action of a spring 410. When the lever 396 is thus held in its ineffective position, the projection 403 is out of the path of movement of the pawl 404 to permit release of the machine for operation at the proper time. A downwardly-extending finger 411, formed integral with the lever 396, coacts with an annular groove formed in a roller 412 freely mounted on a stud 413 to properly guide the lever 396 in its movement.

The means for disengaging the hook 415 of the lever 409 from the stud 407 to permit the spring 410 to rock the lever 396 counter-clockwise to prevent release of the machine for a subsequent operation will now be described. Loosely mounted on the shaft 402 is a two-armed lever 421 (Figs. 9 and 13), one arm of which is connected by a spring 422 to the lever 409 and carries a stud 423, which coacts with a finger 424 formed on the lever 409. The other arm of the lever 421 is connected by a link 425 to one arm of a bell crank lever 426 pivotally mounted on a rod 427 mounted in the printer frames 64 and 65. The other arm of the bell crank lever 426 is pivoted to a feeler 428 slidably mounted on studs 429 and 430 secured to the printer frame 65. A spring 431, connected to a stud 432 in the frame 65 and to a stud 433 carried by one arm of the bell crank lever 426, constantly tends to rock the bell crank lever 426 clockwise to move the feeler 428 upwardly into its effective position, but is prevented from doing so by means which will now be described.

Freely mounted on the shaft 402 is a lever 434, which is constantly urged in a counter-clockwise direction by a spring 435, causing a stud 436 carried by one arm of said lever to coact with a surface 437 on the lever 421 and hold said lever, link 425, and bell crank lever 426 in the positions shown in Fig. 13, against the action of the spring 431. It will readily be seen from the foregoing that, when the lever 421 and the bell crank lever 426 are in the positions shown in said figure, the hook 415 of the lever 409 will engage the stud 407 to maintain the lever 396 in its ineffective position, while the bell crank lever 426 will hold the feeler 428 also in an ineffective position.

Secured on the printer drive shaft 313 is a cam 446 (Figs. 9 and 13), which coacts with a roller 447 carried by one arm of the lever 434. Upon operation of the machine, the shaft 313 will impart a complete clockwise rotation to the cam 446, causing the latter to coact with the roller 447 to rock the lever 434 clockwise. Such clockwise movement of the lever 434 will move the stud 436 away from the surface 437 to permit the lever 421 and, through the link 425, the bell crank lever 426 to be rocked clockwise through the medium of the spring 431. Upon such clockwise movement of the bell crank lever 426, the feeler 428 will thereby be moved upwardly through an opening in the printing table, to contact either a check register form 296 or a payroll control form 297, depending upon which happens to be in the machine. If the feeler 428 comes into contact with the under side of either one of these two different forms, the upward movement of said feeler will thereby be arrested, and, consequently, the feeler will stop the clockwise movement of the bell crank lever 426 and, through the link 425, the lever 421. The clockwise movement which has been given to the lever 421 up to this point is not sufficient to disengage the hook 415 of the lever 409 from the stud 407 to cause the machine to be locked against the subsequent operation.

Means is provided, under control of the total row of keys and the row 1 keys, for rendering the feeler 428 effective only when the machine is operated to perform certain kinds of operations. This means includes a pair of control disks 448 and 449 (Figs. 9 and 13), the disk 448 being freely mounted on the shaft 329, while the disk 449 is secured to said shaft. The disk 448 is differentially adjusted in the same manner as the control disks 325 and 327, previously described, under control of the total row of keys 81—82, while the control disk 449 is differentially adjusted in the same manner as the control disks 326 and 328, previously described, under control of the row 1 transaction keys 78. It is therefore felt that a description of the manner in which the disks 448 and 449 are differentially adjusted will not be necessary herein.

A pair of feelers 450 and 451 are provided to coact with the peripheries of the disks 448 and 449, respectively, said feelers being secured together and arranged opposite each other. The feelers 450 and 451 are pivoted on a stud 452 secured to one arm of a lever 453 freely mounted on the shaft 336. The lever 453 is resiliently connected by a spring 454 to an arm 455 secured to the shaft 336. One arm of the lever 453 carries a stud 456 embraced by the bifurcated end of one arm 457 of a yoke 458 freely mounted on the rod 307. Another arm 459 of the yoke 458 is normally so positioned that the end thereof coacts with a stud 460 carried by an upwardly-extending arm 461 formed integral with the bell crank lever 426, to prevent the necessary clockwise movement of the latter to render the feeler 428 effective.

The "Net check" and "Earnings to date" keys 82 and the "Clear row 2" and the "Clear row 3" keys 81 in the total row control the adjustment of the disk 448 so that notched portions of the periphery thereof will be positioned opposite the feeler 450, while the "Over deduction" and the "Check register" keys 81 control the adjustment of said disk so that unnotched portions of the periphery thereof will be positioned opposite the feeler 450.

Each of the keys 78 in row 1 controls the adjustment of the disk 449, so that unnotched portions of the periphery thereof are positioned opposite the feeler 451, while the "Prior earnings" key 80 in row 3 stops the differential mechanism associated with row 1 in its second position, as hereinbefore described, and thereby controls the adjustment of the disk 449 so that a notched portion of the periphery thereof is positioned opposite the feeler 451.

Immediately after the disks 448 and 449 are adjusted, as above described, the shaft 336 and the arm 455 are rocked counter-clockwise, and the spring 454 tends to cause the lever 453 to be likewise rocked counter-clockwise. If at this time either one or both of the feelers 450 and 451 should coact with a notched portion of the disks 448 and 449, the lever 453 will thereby be permitted to move sufficiently counter-clockwise to rock the yoke 458 clockwise to such an extent that the arm 459 thereof will be removed from the path of movement of the stud 460. The bell crank lever 426 will then be rocked clockwise, by the means previously described, to render the feeler 428 effective.

If both of the feelers 450 and 451 had coacted with unnotched portions of the peripheries of their respective disks 448 and 449, the counter-clockwise movement of the lever 453 would have thereby been limited to such an extent that the arm 459 would not have been removed from the path of movement of the stud 460, and the feeler 428 would therefore have remained ineffective.

Means is provided for rocking the arm 406 slightly clockwise during each operation to facilitate the disengagement of the hook 415 of the lever 409 from the stud 407 when the lever 396 is to be rocked counter-clockwise to lock the machine against a subsequent operation. This means includes a lever 462 (Figs. 9 and 13), which is secured to the shaft 402 and which is normally urged in a counter-clockwise direction by a spring 463 to maintain a roller 464 carried by one arm of said lever 462 into cooperative relationship with a cam 465, as well as maintain the stud 407 on the arm 406 in engagement with the hook 415 of the lever 409. The cam 465 is secured to the shaft 313 and receives one complete clockwise rotation therewith during each operation of the machine. During such clockwise movement, the cam 465 coacts with the roller 464 to rock the lever 462, the shaft 402, and the arm 406 slightly clockwise, thereby moving the stud 407 downwardly and away from the substantially horizontal portion of the hook 415 of the lever 409. It will thus be seen from the above that, when the lever 409 is rocked counter-clockwise to lock the machine against a subsequent operation, under control of the feeler 428 when there is no form 296 or 297 in the machine, and when any one of the "Net check," "Earnings to date," "Clear row 2," "Clear row 3," or "Prior earnings" keys is depressed, the release of the hook 415 from the stud 407 will be easily accomplished by the stud 423, whereupon the spring 410 rocks the lever 396 to prevent subsequent operation of the machine by preventing movement of the release shaft 75. At this time, the stud 407 is raised so as to be positioned in front of the end 470 of the hook 415, which, it will be recalled, has been moved to the left by the stud 423.

It might be well to state here that the lever 396 does not stop the operation of the machine at the time that it is released for its effective locking of subsequent operation of the machine. Due to the fact that at the time said lever 396 is released, the pawl 404 (Fig. 13) has been rocked clockwise at the beginning of that operation and is in a position underlying the projection of the lever 396, when the lever 396 is released for operation by the release of the stud 407 from the hook 415, the spring 410 can rock the lever 396 only a slight distance until the projection 403 contacts that part of the pawl 404 which is underlying the same at that time. During this same operation of the machine, however, when the pawl 404 is restored to normal position, it is moved counter-clockwise out from beneath the projection 403 to the position shown in Fig. 13, whereupon the spring 410 immediately rocks the lever 396 farther counter-clockwise to position the projection 403 opposite or in the path of the pawl 404 to prevent its clockwise movement, which is necessary to release the machine for a subsequent operation.

Now, before the machine can be operated again, the operator is compelled to manually operate means for releasing said locking means. This manually operable means includes a lever 471 (Figs. 9, 10, and 13) pivoted on a stud 472 secured to the right printer frame 65. The vertical arm of the lever 471 is provided with a finger piece 473, while the horizontal arm of said lever is bifurcated to embrace a stud 474 carried by an arm 475 secured to a shaft 476 suitably journaled in the printer frames 64 and 65. Also secured to the shaft 476 is an arm 477 provided with a surface 478, which is adapted to coact with a stud 479 carried by the upper arm of a lever 480 pivotally mounted on the rod 307. The lower arm of the lever 480 is connected by a link 481 to the vertical arm of the lever 462. A spring 482 normally maintains the lever 471 in its normal position.

To release the above-mentioned locking lever 396, the operator manually moves the lever 471 counter-clockwise against the action of the spring 482, thereby rocking the arm 475, the shaft 476, and the arm 477 clockwise. Upon such clockwise movement of the arm 477, the surface 478 thereof coacts with the stud 479 to rock the lever 480 and, through the link 481, the lever 462 clockwise. Such clockwise movement of the lever 462 is sufficient to rock the shaft 402 and the arm 406 clockwise t such an extent as to move the stud 407 downwardly away from the end 470 of the hook 415, which permits the now stretched spring 422 to rock the lever 409 clockwise to engage the hook 415 over the top of the stud 407, and at the same time the lever 462 returns the lever 396 to its normal ineffective position.

Operation

A brief description will now be given of the operation of the machine so far as the present invention is concerned. As previously mentioned, the instant machine is especially adapted for use in connection with the preparation of payrolls and the writing of the payroll checks. Such a machine is capable of accumulating therein, as well as printing on various inserted record materials, the gross earnings of an employee, the various deductions to be made therefrom, and the net earnings which are actually paid to the employee by the employer.

The operator is first furnished with all of the employees' time records for a particular department or unit, which records include the amount of taxable wages, non-taxable wages, the differential, etc., the amount of Social Security tax, and a record of all authorized deductions for each employee.

When beginning a series of recording and check-writing operations in connection with the preparation of the payroll and the pay checks for a particular department or unit, the operator inserts a check register form 296 (Fig. 12) in the machine, face down. The first entry to be made in the machine in connection with an employee's record is the amount of the prior earnings for that particular employee. This amount is set up on the amount keys, and the "Prior earnings" key 80 is depressed. Depression of the "Prior earnings" key 80 in row 3 controls the differential mechanism for the row 1 keys, so that the feeler 428 is thereby rendered effective to ascertain whether or not a pay check register form is in the machine. If no pay check register form has been placed in the machine, the feeler will cause the machine to be locked against a subsequent operation. When the operator attempts to make the next entry into the machine, his attention is called to the fact that there is no check register form therein by reason of the machine's being locked against operation. The operator then releases the machine for operation by use of the manually operable release means.

Later in the sequence of operations necessary to record all of the various data in connection with an employee's account—i. e., when the "Earnings to date" key 82 in the total row is depressed to cause the machine to accumulate the earnings to date—the feeler is thereby again rendered effective to ascertain whether or not a pay check register form is in the machine. Again, if no such form is in the machine, the machine will be locked against a subsequent operation. When the operator attempts to make the next entry into the machine, his attention is called to the fact that there is no pay check register form in the machine by the locked condition of the machine. The operator again must use the manually operable release means before the machine can be rendered operable.

When all the data concerning an employee's account has been entered in the machine and the operator is ready to print the net amount of the payroll check, the "Net check" key 82 is depressed. The depression of the "Net check" key 82 renders the feeler 428 effective to again ascertain whether or not the pay check register form is in the machine. If no such form is in the machine, the machine is again locked against a subsequent operation. When it is attempted to enter additional data into the machine, the operator's attention is again called to the fact that there is no pay check register form in the machine by the machine's being locked against operation.

The pay check register form is made of such length that after such form has been fed far enough into the machine to print in the next-to-last printing space thereon, the remaining portion of such form is not of sufficient length for the feeler 428 to come into contact therewith when the feeler is rendered effective by depression of the "Net check" key 82, thereby causing the machine to be locked against a subsequent operation. The purpose of having this condition occur when printing takes place in the next-to-the-last printing space on the pay check register form is to have the operator's attention called at this time to the fact that printing has taken place in such space, and thereby permit the operator to operate the machine to print a subtotal during the next operation of the machine in the last printing space on the check register form before removing the form from the machine. It is, of course, necessary for the operator to manipulate the manually operable release means before the machine can be operated to print the subtotal amount on the pay check register form.

The foregoing operations are repeated until the earnings record and check for the last employee in the payroll unit have been prepared. A total of the amounts of the checks is then imprinted on the check register form by depression of the "Check register" control key 82. The check register form is then removed from the machine, and the payroll control form (Fig. 11) is inserted in its place. The payroll control form is provided with two printing line spaces opposite each classification total thereon, one of said spaces containing predetermined totals previously entered therein manually, while the other space receives printed totals from the machine when the different totalizers are cleared. The amounts thus recorded afford comparison with one another.

When the various totalizers in the machine are cleared, the "Clear row 2" key 81 is depressed in connection with the particular key 79 corresponding to the totalizer which it is desired to clear. The depression of the "Clear row 2" key 81 renders the feeler 428 effective to ascertain whether or not there is a payroll control form in the machine. If not, then the machine is thereby locked against a subsequent operation. When the operator attempts to operate the machine again to clear a different totalizer, the locked condition of the machine will indicate that it has been operated without the payroll control form therein.

When any of the totalizers corresponding to row 3 are cleared, the "Clear row 3" key 81 is depressed in connection with the particular key 80 corresponding to the totalizer which it is desired to clear. The depression of the "Clear row 3" key 81 renders the feeler 428 effective to ascertain whether or not there is a payroll control form in the machine. If not, then the machine is again locked against subsequent operation. Upon the next operation of the machine, the locked condition thereof will indicate to the operator that the machine was operated without the payroll control form therein.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine adapted to print on insertable record material, the combination of a plurality of control keys; control disks differentially adjustable under the control of said keys; a feeling device to sense the presence or absence of record material in the machine; means normally retaining the feeling device in inactive condition, said means being releasable by said disks when the disks are set under control of certain of said control keys; and means under control of said feeling device for locking the machine against a subsequent operation when the feeler is released for a sensing operation during a machine operation during which no record material is in the machine.

2. In a machine having means to print on insertable record material provided with a plurality of printing spaces, and means to feed the record material into printing positions, the combination of a plurality of control keys; control disks differentially adjustable under the control of said keys; a feeling device to sense the presence or absence of record material in the machine; means to normally maintain the feeling device inactive, said means being under the control of said disks to release said feeling device when the disks are differentially adjusted under control of certain ones of said keys; and means, under control of said feeling device when the feeling device is released, for locking the machine against a subsequent operation when the machine is operated with no record material in the machine, or after the record material has been fed into position to receive a print in a certain one of the spaces on said record material, in which position the record material is out of the range of the feeling device.

3. In a machine having means to print on insertable record material provided with a plurality of printing spaces, and means to feed the record material into printing positions, the combination of a plurality of control keys; control disks differentially adjustable under control of said keys; a feeling device to sense the presence or absence of record material in the machine; means normally maintaining said feeling device ineffective but adapted under control of said disks when adjusted under control of certain ones of said keys to render said feeling device effective; and means under control of said feeling device, when active, for locking the machine against subsequent operations when the machine is operated either without said record material in the machine, or when said record material is in the machine and has been fed into a position wherein printing is performed in a certain one of said spaces on said record material and the record material is out of the range of the feeling device.

4. In a machine having means to print on insertable record material provided with a plurality of printing spaces, and means to feed the record material into positions to receive impressions in said spaces, the combination of a plurality of control keys; a plurality of control disks differentially adjustable under control of said keys; a feeling device to sense the presence or absence of record material in the machine; means normally rendering said feeling device ineffective but adapted under control of said disks when differentially adjusted under control of certain ones of said keys to render said feeling device effective; means under control of said feeling device, when active, for locking the machine against a subsequent operation, when the machine is operated after the record material has been fed into position to receive an impression in a certain one of the printing spaces on said record material, wherein the record material is out of the path of movement of said feeling device; and manually operable means for releasing said locking means to permit operation of the machine.

5. In a machine having means to print on insertable record material provided with a plurality of printing spaces, and means to feed the record material to selected printing spaces for receiving impressions, the combination of a plurality of control keys; a plurality of control disks differentially adjustable under control of said keys; a feeling device to sense the location or absence of record material in the machine; means under control of said control disks when differentially adjusted under control of certain ones of said control keys for determining the effectivity of said feeling device; and means under control of said feeling device, when the feeling device is effective, to sense the location of record material in the machine for locking the machine against subsequent operation when the record material has been fed into a position out of the path of the feeling device and into a position to receive a print in a certain one of the spaces on said record material.

6. In a machine of the class described having printing mechanism adapted to print on an inserted slip provided with a plurality of printing spaces; means to position the record material relatively to the printing mechanism to select printing spaces to receive prints; a plurality of control keys to control the machine for various kinds of entries; and machine release means under control of said keys for releasing the machine for operation, the combination of a resiliently operated member for coacting with said release means to prevent the operation of the machine; means normally holding said member out of cooperative relationship with said release means; a feeling device cooperable with the inserted slip; means differentially adjustable under control of said keys to control the effectiveness of the feeling device; and means under control of said feeling device for coacting with said holding means to permit the member to move into cooperative relationship with the release means to prevent a subsequent operation of the machine when the machine is operated to make a certain kind of operation with the slip in position to receive an entry in a certain one of the printing spaces on said slip, in which position the slip is out of the path of the feeling device.

7. In a machine of the class described having a printing mechanism adapted to print on an inserted slip; means to feed the slip to present different areas to the printing mechanism; a plurality of control keys to control the machine to make certain kinds of entries; and machine release means under control of said keys for releasing the machine for operation, the combination of a resiliently operated member for coacting with said release means to prevent the operation of the machine; retaining means for holding said member out of cooperative relationship with said release means; a feeling device cooperable with the inserted slip to sense the position thereof; control disks under control of said keys for determining the effectivity of the feeling device when making different kinds of entries; and means under control of said feeling device for actuating said retaining means to permit said member to coact with the release means to lock the machine against a subsequent operation upon operation of the machine with certain of the control keys depressed and with the slip in a position out of the path of the feeling device.

8. In a machine of the class described having printing mechanism adapted to print on an inserted slip; feed means for the slip; a plurality of control keys to control the machine for different kinds of entries; and machine release means under control of said keys for releasing the machine for operation, the combination of resiliently operated means for coacting with said release means to prevent release of the machine for operation; retaining means normally engaged with said resiliently operated means to hold the latter out of cooperative relationship with said release means; a feeling device to coact with the inserted slip; control disks differentially adjustable under control of said keys; means under control of said disks for controlling the operation of said feeling device; means under control of said feeling device for disengaging the retaining means from the resiliently operated means to cause the latter to coact with the release means to lock the machine against a subsequent operation when the slip has been fed out of the path of the slip during certain kinds of operations; and a manually operable manipulative device for moving the resiliently operated means out of cooperative relationship with the release means and engaging the retaining means with said resiliently operated means to render the machine operable to make a subsequent entry regardless of the position of said insertable slip.

9. In a machine of the class described, having printing mechanism adapted to print on an inserted slip provided with a plurality of printing spaces; means to feed the slip to select spaces to receive printed impressions; a plurality of control keys to control the machine for entries of different classifications; and machine release means under control of said keys for releasing the machine for operation, the combination of resiliently operated means for coacting with said release means to prevent release of the machine for operation; retaining means; means intermediate said retaining means and said resiliently operated means for normally holding the latter out of cooperative relationship with said release means; and a feeling device cooperable with the slip and adapted, when the machine is operated to enter an item of a certain classification and the slip has been fed out of range of the feeling device and into position to receive an impression in a certain space on the slip, to operate said retaining means and through said intermediate means release said member to coact with the release means to prevent a subsequent operation of the machine.

10. In a machine adapted to print on insertable record material provided with a plurality of printing spaces; means to feed the record material to select spaces to receive impressions; and a plurality of control keys to control the machine for entries of different classifications, the combination of means differentially adjustable under control of said keys; a member adapted to lock the machine against operation; retaining means preventing operation of said member; a feeling device cooperable with the inserted record material but normally held in an ineffective position; and means under control of said differentially adjustable means for rendering the feeling device effective whereby, during an operation of the machine in which the record material is fed out of range of the feeling device and into a position to select a certain space of said record material, said feeler releases said retaining means, whereupon the locking means is rendered operable to prevent an immediate subsequent operation of the machine.

11. In a machine adapted to print on insertable record material, the combination of a plurality of control keys to control the machine for entries of different kinds; means differentially adjustable under control of said keys in accordance with the type of entry being made; a member adapted to lock the machine against operation; retaining means preventing operation of said member; a feeling device to sense the presence or absence of record material in the machine but normally held in an ineffective position; and means under control of said differentially adjustable means for rendering the feeling device effective whereby, during a certain kind of operation of the machine, in which there is no record material in the machine, said feeling device is rendered effective to release said retaining member to cause said locking means to lock the machine against an immediate subsequent operation.

12. In a machine adapted to print on insertable record material, the combination of a plurality of control keys to control the machine for effecting different kinds of operations; a plurality of control members differentially adjustable under control of said keys in accordance with the kind of entry being made; a normally inactive machine locking member; a retaining device for holding said member in an inactive position; means for operating the retaining member to free the locking member; a normally inoperable feeling device which when operable is cooperable with the insertable record material; means intermediate said feeling device and the retaining device operating means to operate the latter to free the retaining device from the locking member upon operation of the feeling device when no record material is in the machine; and means intermediate the first intermediate means and said control members for controlling said first intermediate means and the feeling device.

PASCAL SPURLINO.
MAYO A. GOODBAR.
MARVIN D. FROST.